US012163517B2

(12) United States Patent
Yoo et al.

(10) Patent No.: US 12,163,517 B2
(45) Date of Patent: Dec. 10, 2024

(54) SCROLL COMPRESSOR WITH OLDHAM RING AND KEYS IN ORBITING SCROLL

(71) Applicant: LG Electronics Inc., Seoul (KR)

(72) Inventors: Byungkil Yoo, Seoul (KR); Jehyeon Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/004,254

(22) PCT Filed: Jul. 6, 2021

(86) PCT No.: PCT/KR2021/008607

§ 371 (c)(1),
(2) Date: Jan. 4, 2023

(87) PCT Pub. No.: WO2022/145603

PCT Pub. Date: Jul. 7, 2022

(65) Prior Publication Data

US 2023/0304496 A1 Sep. 28, 2023

(30) Foreign Application Priority Data

Dec. 29, 2020 (KR) ........................ 10-2020-0186345

(51) Int. Cl.
*F04C 18/02* (2006.01)
*F01C 17/06* (2006.01)
*F04C 29/00* (2006.01)

(52) U.S. Cl.
CPC ........ *F04C 18/0215* (2013.01); *F01C 17/066* (2013.01); *F04C 18/0246* (2013.01);
(Continued)

(58) Field of Classification Search
CPC .............. F04C 18/0215; F04C 18/0246; F04C 29/0057; F04C 2240/805; F04C 2270/16;
(Continued)

(56) References Cited

U.S. PATENT DOCUMENTS 4,927,339 A * 5/1990 Riffe .................... F04C 27/005 418/55.6
2017/0234313 A1 8/2017 Fullenkamp et al.
2019/0383289 A1 12/2019 Fullenkamp et al.

FOREIGN PATENT DOCUMENTS

JP 2013-241854 12/2013
JP 2017-133466 8/2017
(Continued)

OTHER PUBLICATIONS

Foreign Patent and Machine translation for JP 2017-133466 A; Inventor: Takuma et al; Title: Scroll Compressor, Published: Aug. 3, 2017. (Year: 2017).*

(Continued)

*Primary Examiner* — Mary A Davis
(74) *Attorney, Agent, or Firm* — Fish & Richardson P.C.

(57) ABSTRACT

A scroll compressor includes a fixed scroll, an orbiting scroll, a rotating shaft, an Oldham ring, and a plurality of first keys. The orbiting scroll is configured to engage the fixed scroll. The rotating shaft is eccentrically coupled to the orbiting scroll and configured to operate the orbiting scroll. The Oldham ring has a ring body that defines a plurality of slots. The plurality of first keys are coupled to the orbiting scroll and inserted to the plurality of slots, respectively. The plurality of first keys are configured to slide at the plurality of slots in a radial direction and include a material different from a material of the Oldham ring.

11 Claims, 12 Drawing Sheets

(52) U.S. Cl.
CPC .... *F04C 29/0057* (2013.01); *F04C 2240/805* (2013.01); *F04C 2270/16* (2013.01); *F05B 2280/101* (2013.01); *F05B 2280/1021* (2013.01)

(58) Field of Classification Search
CPC .............. F01C 17/066; F05B 2280/101; F05B 2280/1021
See application file for complete search history.

(56) References Cited

FOREIGN PATENT DOCUMENTS

| | | |
|---|---|---|
| KR | 10-2017-0029313 | 3/2017 |
| KR | 10-2060474 | 12/2019 |
| KR | 10-2081341 | 2/2020 |

OTHER PUBLICATIONS

Foreign Patent Publication and Machine Translation for KR 10-2060474 B1; Title: Scroll Compressor; Published: Dec. 30, 2019. (Year: 2019).*

Foreign Patent Publication and Machine Translation for JP 2013-241854 A, Inventor: Takeshi et al; Title: Rotation Preventing Mechanism and Scroll Compressor Using the Same; Published: Dec. 5, 2013. (Year: 2013).*

Office Action in Korean Appln. No. 10-2020-0186345, dated Jan. 12, 2022, 18 pages (with English translation).

Written Decision on Registration in Korean Appln. No. 10-2020-0186345, dated Jul. 7, 2022, 4 pages (with English translation).

* cited by examiner

SCROLL COMPRESSOR WITH OLDHAM RING AND KEYS IN ORBITING SCROLL

CROSS-REFERENCE TO RELATED APPLICATIONS

This application is a National Stage application under 35 U.S.C. § 371 of International Application No. PCT/KR2021/008607, filed on Jul. 6, 2021, which claims the benefit of Korean Application No. 10-2020-0186345, filed on Dec. 29, 2020. The disclosures of the prior applications are incorporated by reference in their entirety.

TECHNICAL FIELD

The present disclosure relates to a scroll compressor having an Oldham ring for preventing rotation of an orbiting scroll.

BACKGROUND

A scroll compressor is a device for compressing refrigerant by having a motor part and a compression part accommodated in a sealed accommodation space. The motor part is connected to the compression part by a rotating shaft, to transmit rotational force to the compression part through the rotating shaft.

The compression part includes a fixed scroll and an orbiting scroll. The orbiting scroll performs an orbiting motion relative to the fixed scroll by the rotational force transmitted from the motor part. The fixed scroll and the orbiting scroll form a compression chamber having a suction chamber, an intermediate pressure chamber, and a discharge chamber. The refrigerant is suctioned into the compression chamber, compressed, and then discharged.

The scroll compressor has an anti-rotation mechanism for preventing the rotation of the orbiting scroll.

An Oldham ring (also called "Oldham's Coupling") or a pin-and-ring type may be applied as the anti-rotation mechanism.

The pin-and-ring type anti-rotation mechanism may be advantageous compared to the Oldham ring type in terms of improving reliability by improved durability and reducing a weight of the compressor by a reduced weight.

However, the pin-and-ring type is relatively disadvantageous in terms of an assembling property because a plurality of pins and rings must be respectively installed on the orbiting scroll and a member in contact with the orbiting scroll.

For this reason, research to replace the pins and rings by improving a material of Oldham Ring is undergoing.

In particular, the scroll compressor can improve motor efficiency by making the Oldham ring using an aluminum material to reduce a weight of the Oldham ring.

On the other hand, in consideration of the improvement of the motor efficiency, it is advantageous to manufacture the orbiting scroll and the main frame, in addition to the Oldham ring, by using the aluminum.

However, when the orbiting scroll and the main frame are also made of the aluminum, friction surfaces relative to the Oldham ring are also made of the same aluminum, which drastically deteriorates friction characteristics.

Recently, techniques for improving a wear problem caused by friction between the Oldham ring and components relative to the Oldham ring have been introduced.

In order to solve the deterioration of the friction characteristics that is caused when the Oldham ring is made of the same type of material as the aluminum forming the orbiting scroll, it may be considered to change the material of the Oldham Ring to an iron-based material.

However, if the entire Oldham ring is made of the iron-based material, the weight of the Oldham ring increases and this causes an increase in vibration and noise due to a reciprocating motion of the Oldham ring during a high-speed operation. This also increases a material cost of the Oldham ring itself.

In order to solve the above problems, some related art discloses a compressor having a self-assembly Oldham ring.

Such a compressor discloses a technology capable of increasing wear resistance while lightening a weight of the Oldham ring by press-fitting or bonding a key part made of a different material from a ring part of the Oldham ring to the ring part.

However, this compressor has the following problems.

First, in order to press-fit the key part to the ring part, a fixing protrusion for fixing the key part should be formed to protrude from one side surface of the ring part in an axial direction. However, since a cross-sectional area of the fixing protrusion to be coupled to the key part decreases, supporting strength of the ring part for the key part may be weakened. This may lower mechanical reliability for the Oldham ring.

Second, when assembling the ring part and the key part, there may be a clearance in a coupled portion due to a machining error or an assembly error. In this case, the orbiting scroll may be pushed in a circumferential direction as the key part gets twisted with respect to the ring part when the compressor is driven. This may cause a separation between a fixed wrap and an orbiting wrap, thereby increasing compression loss. The clearance of the key part may be prevented by applying an adhesive between the key part and the fixing protrusion, but the addition of the adhesive applying process increases the number of processes.

Third, the key part may be separated from the ring part or rotates in the ring part in vain due to a difference of a thermal expansion coefficient between the ring part and the key part.

Some related art discloses a technology that an Oldham ring is made of aluminum but only a key part of the Oldham ring that substantially rubs against a main frame and an orbiting scroll is made of an iron-based material (or a material different from the material of the Oldham ring), such that the key part of the Oldham ring is press-fitted or bonded to a fixing protrusion integrally formed with a ring part of the Oldham ring.

However, this technology has the following problems.

First, when it is failed to secure a thickness of the fixing protrusion to which the key part is press-fitted, the fixing protrusion may be damaged.

Second, when the fixing protrusion does not have a sufficient height, it has a small press-fitting or bonding area, which causes the key part to be separated from the fixing protrusion.

Third, a coating layer that is made of a lubricating material or the like may also be formed on a surface of the Oldham ring. However, the formation of the separate coating layer may increase a fabricating cost and also the coating layer may come off or be worn due to a long-term use, thereby causing damage or increased friction loss of the Oldham ring.

Other related art discloses a scroll compressor.

In this related art, a wear-resistant member is disposed between a key groove of an orbiting scroll and a key part of an Oldham ring, to prevent a direct contact between the orbiting scroll and the Oldham ring. In addition, deterioration of frictional characteristics due to friction between the same types of materials can be prevented while the Oldham ring is formed of the same type of material as a material forming the orbiting scroll.

However, since the wear-resistant member of this scroll compressor is a steel plate with a thin thickness, it is advantageous in terms of machinability, but the thin thickness may lower rigidity of the wear-resistant member which may cause deformation of the wear-resistant member when it is press-fitted to the key groove.

In addition, if a surface of the wear-resistant member is not formed evenly during machining of the wear-resistant member, an assembly property of the wear-resistant member may be deteriorated.

Even if the wear-resistant member is coupled to the key groove, the deformation of the wear-resistant member may cause a problem that the key part of the Oldham ring is caught in the wear-resistant member during sliding along the wear-resistant member.

Other related art discloses a scroll compressor.

Such other related art discloses a technology for reducing wear of a key part of the Oldham ring and a key groove in which the key part slides.

Such other related art includes a liner formed in a U-like shape on the key groove and the liner is formed of a material different from a base material of the key groove, which can prevent wear of the key part and the key groove.

However, this scroll compressor discloses a structure for preventing the liner from being radially separated from the key groove, but does not disclose a structure for preventing the liner from being axially separated from the key groove.

Due to this, the liner of this scroll compressor may be separated from the key groove in the axial direction.

SUMMARY

A first aspect of the present disclosure is to provide a scroll compressor capable of improving motor efficiency by reducing a weight of an Oldham ring while applying the Oldham ring as an anti-rotation mechanism.

A second aspect of the present disclosure is to provide a scroll compressor capable of forming an Oldham ring using the same type of material as a material of a frame or orbiting scroll, to which the Oldham ring is coupled, or a fixed scroll.

A third aspect of the present disclosure is to provide a scroll compressor capable of enhancing reliability by securing support strength of an Oldham ring key.

A fourth aspect of the present disclosure is to provide a scroll compressor capable of enhancing efficiency of the compressor by simplifying a structure of a first key and a slot accommodating the first key and suppressing a generation of a clearance that is an allowable value or greater.

A fifth aspect of the present disclosure is to provide a scroll compressor capable of preventing an Oldham ring key from being separated from or rotating in vain in a key coupling portion due to a difference in thermal expansion.

A sixth aspect of the present disclosure is to facilitate machining a key hole, in which an Oldham ring key is accommodated, and to improve precision.

A seventh aspect of the present disclosure is to provide a scroll compressor capable of constantly maintaining frictional area and surface pressure of an Oldham ring key by preventing the Oldham ring key from being exposed to outside of a key hole while an orbiting scroll pivots.

An eighth aspect of the present disclosure is to provide a scroll compressor capable of using an existing shape of an Oldham ring as it is when a key receiving portion of the Oldham ring is press-fitted to an orbiting end plate of an orbiting scroll.

In order to achieve the first object described above, there is provided a scroll compressor that may include: a fixed scroll; an orbiting scroll engaged with the fixed scroll; a rotating shaft eccentrically coupled to the orbiting scroll and configured to operate the orbiting scroll; an Oldham ring having a ring body in an annular shape and a plurality of slots formed in the ring body; and a plurality of first keys disposed on the orbiting scroll, slidably received in the plurality of slots in a radial direction, respectively, and formed of a material different from that of the Oldham ring.

With the configuration, the Oldham ring can be decreased in weight so as to improve motor efficiency, thereby improving friction characteristics.

In one embodiment, each of the first keys may protrude from one axial side surface of the orbiting scroll to an inside of the slot, and the slot may extend from the ring body in a radial direction and may be formed through the ring body in a thickness direction of the ring body.

With the configuration, the first key can slide along the slot in the radial direction of the ring body, such that the orbiting scroll can perform an orbiting motion relative to the fixed scroll. This can prevent rotation of the orbiting scroll.

In one embodiment, the orbiting scroll and the Oldham ring may be made of the same material.

The orbiting scroll and the Oldham ring may be formed of an aluminum material, and the first key may be formed of an iron-based material.

In another embodiment, the first keys may be made of a porous material.

With this configuration, it can be advantageous in terms of lubrication of the compressor.

In one embodiment, each of the first keys may protrude from one axial side surface of the orbiting scroll to an inside of the slot, and the slot may extend in the radial direction of the ring body, and may have one side open toward the first key and an opposite side shielded by a shielding portion.

This can reinforce rigidity of a surrounding portion of the slot, and oil can be stored inside the slot.

In order to achieve the third and fourth aspects of the present disclosure, the first key may have a rectangular cross-sectional shape, a radial length of the slot may be longer than a radial length of the first key, and a widthwise side surface of the slot may be slidably brought into contact with a side surface of the first key facing the same.

With the configuration, the first key can secure a thickness, so as to reinforce rigidity thereof.

In one embodiment, a fixing groove may be formed to be recessed in one axial side surface of the orbiting scroll, and the first key may be press-fitted into the fixing groove.

This can secure a height for fixing the first key.

In order to achieve the fifth aspect of the present disclosure, the orbiting scroll may include an orbiting scroll end plate formed in a disk shape and supporting an orbiting wrap engaged with the fixed scroll, a plurality of fixing grooves formed in one axial side surface of the orbiting scroll end plate, a plurality of first fastening holes respectively formed toward the fixing grooves through another axial side surface of the orbiting scroll end plate, and a plurality of fastening members disposed to fasten the first keys, coupled to the fixing grooves through the plurality of first fastening holes, to the orbiting scroll.

With the configuration, the first key received in the fixing groove can be prevented from rotating in vain.

In another embodiment to achieve the fifth aspect described above, the orbiting scroll may further include an orbiting scroll end plate supporting the orbiting wrap engaged with the fixed scroll, a plurality of fixing grooves formed in one axial side surface of the orbiting scroll end plate facing an opposite side to the fixed scroll, a plurality of fastening grooves respectively recessed in a radial outer surface of the orbiting scroll end plate part in a direction crossing the fixing grooves, second fastening holes formed to radially overlap the fastening grooves such that the first keys are inserted therethrough, and press-fit pins fastened through the second coupling holes via the fastening grooves, such that the first keys coupled to the fixing grooves are fastened to the orbiting scroll.

With the configuration, the first key received in the fixing groove can be prevented from rotating in vain.

In order to achieve the sixth and seventh aspects described above, the Oldham ring may include protrusions protruding radially from at least one of an outer circumferential surface and an inner circumferential surface of the ring body, and the slots may be formed in the protrusions, respectively.

According to this configuration, a size of the slot can be secured.

In one embodiment of the present disclosure, the scroll compressor may further include a casing, and a frame fixed to an inside of the casing together with the fixed scroll and rotatably supporting the rotating shaft. The Oldham ring may be disposed between the orbiting scroll and the frame. The Oldham ring may include a plurality of second keys protruding from one axial side surface of the ring body toward the frame and slidably received in a plurality of key grooves formed in the frame.

According to this configuration, the rotation of the orbiting scroll can be prevented.

According to another embodiment of the present disclosure, a scroll compressor may include: a casing; a fixed scroll having a fixed wrap and fixed to an inside of the casing; an orbiting scroll having an orbiting wrap engaged with the fixed wrap to define a compression chamber together with the fixed scroll; a rotating shaft eccentrically coupled to the orbiting scroll and configured to operate the orbiting scroll; a frame fixed inside the casing together with the fixed scroll and rotatably supporting the rotating shaft; an Oldham ring having a ring body, and a plurality of first slots and a plurality of second slots alternately disposed on the ring body to be spaced apart from each other with a phase difference of 90 degrees in a circumferential direction; a plurality of first keys disposed on the orbiting scroll, slidably received in the plurality of first slots, respectively, and formed of a material different from a material of the Oldham ring; and a plurality of second keys disposed on the frame, slidably received in the plurality of second slots, respectively, and formed of a material different from a material of the frame.

With the configuration, the Oldham ring can be decreased in weight so as to improve motor efficiency, thereby improving friction characteristics.

In order to achieve the second aspect described above, the Oldham ring may be disposed between the orbiting scroll and the frame. The orbiting scroll, the frame, and the Oldham ring may be formed of the same material that is an aluminum material. The first keys may be disposed between the orbiting scroll and the Oldham ring to frictionally contact the first slots. The second keys may be disposed between the frame and the Oldham ring to frictionally contact the second slots. The first keys and the second keys may be formed of an iron-based material that is different from the material of the Oldham ring.

In order to achieve the eighth aspect described above, a scroll compressor according to one embodiment may include: a fixed scroll; an orbiting scroll engaged with the fixed scroll; a rotating shaft eccentrically coupled to the orbiting scroll and configured to operate the orbiting scroll; an Oldham ring having a ring body, and a plurality of first keys formed on the ring body; and a plurality of first key groove forming parts disposed in the orbiting scroll, each having a first key groove in which the first key is slidably received, and formed of a material different from a material of the Oldham ring and the orbiting scroll; and separation prevention members each configured to prevent the first key groove forming part from being separated from the orbiting scroll. The plurality of first key groove forming parts may be coupled to first key groove mounting parts recessed in one axial side surface of the orbiting scroll that faces an opposite side to the fixed scroll. Each of the first key groove forming parts may include a plurality of side wall plates, an inner plate formed in a curved shape to connect one radial side of each of the plurality of side wall plates, and a horizontal plate formed in a planar shape to connect one axial side surface of each of the plurality of side wall plates.

According to this configuration, the separation prevention member can prevent the first key groove forming part from being separated from the orbiting scroll in the radial and axial directions.

In one embodiment of the present disclosure, the separation prevention member may include a fastening member inserted through the horizontal plate to be fastened to the first key groove mounting part.

A scroll compressor according to one embodiment of the present disclosure may include: a fixed scroll; an orbiting scroll engaged with the fixed scroll; a rotating shaft eccentrically coupled to the orbiting scroll and configured to operate the orbiting scroll; an Oldham ring having a ring body, and a plurality of first keys formed on the ring body; a plurality of first key groove forming parts disposed in the orbiting scroll, each having a first key groove in which the first key is slidably received, and formed of a material different from a material of the Oldham ring and the orbiting scroll; and separation prevention parts each configured to prevent the first key groove forming part from being separated from the orbiting scroll. Each of the first key groove forming parts may include a plurality of side wall plates, and an inner plate connecting one radial side of each of the plurality of side wall plates. The separation prevention part may include protrusions disposed on outer surfaces of the side wall plates to be inserted into protrusion receiving grooves that are formed in inner walls of the first key groove forming part.

A scroll compressor according to another embodiment related to the present disclosure may include: a fixed scroll; an orbiting scroll engaged with the fixed scroll; a rotating shaft eccentrically coupled to the orbiting scroll and configured to operate the orbiting scroll; an Oldham ring having a ring body, and a plurality of first keys formed on the ring body; a plurality of first key groove forming parts disposed in the orbiting scroll, each having a first key groove in which the first key is slidably received, and formed of a material different from a material of the Oldham ring and the orbiting scroll; and separation prevention parts each configured to prevent the first key groove forming part from being separated from the orbiting scroll. Each of the first key groove forming parts may include a plurality of side wall plates, and an inner plate connecting one radial side of each of the plurality of side wall plates. The separation prevention part may include a fixing protrusion protruding radially from an outer surface of the inner plate to be fixedly inserted into a protrusion fixing groove formed in the orbiting scroll.

According to this configuration, the rotation of the orbiting scroll can be prevented.

According to embodiments of the present disclosure, the following effects can be obtained.

First, an Oldham ring can be made of an aluminum material that is the same material as that of an orbiting scroll, so as to be decreased in weight, thereby improving motor efficiency.

Second, a first key protrudes from a lower surface of the orbiting scroll toward the Oldham ring. The first key can be received in a slot formed in the Oldham ring, so as to be slidable along the slot. The first key is formed of an iron-based material that is different from that of the orbiting scroll.

With this configuration, even if the Oldham ring is made of the same material as the orbiting scroll, only the first key of the orbiting scroll that rubs against the slot of the Oldham ring is formed of the iron-based material that is different from the material of the orbiting scroll, thereby improving friction/wear characteristics.

Third, instead of a structure in which a first key covers at least one side surface of a fixing protrusion protruding from one axial side surface of an Oldham ring, an integrated structure in which the first key protrudes from a second end plate of the orbiting scroll to be received in the slot of the Oldham ring can be employed. This can reinforce support stiffness and rigidity of the first key 110 without reducing a thickness of the first key 110.

In addition, a transverse or longitudinal length of the first key may be the same as or similar to a width of the slot.

Fourth, since the first key does not have the structure in which the first key is coupled to a fixing protrusion protruding from one axial side surface of the Oldham ring, a generation of clearance due to a machining error and an assembly error between the fixing protrusion and the first key of the Oldham ring can be prevented.

Fifth, the first key is press-fitted to a fixing groove formed in the second end plate of the orbiting scroll, so that a height of the first key cannot be limited by a height of the fixing protrusion that protrudes from the one axial side surface of the Oldham ring, and a depth or width of the first key that is press-fitted or bonded to the orbiting scroll can be deeply widely secured.

Sixth, since the first key has a rectangular cross-sectional shape, the first key can be prevented from being separated from or rotating in vain in the fixing groove.

Seventh, since the orbiting scroll into which the first key is press-fitted is made of an aluminum material, machining convenience and precision for the fixing groove of the orbiting scroll into which the first key is press-fitted can be increased.

Eighth, since the first key is formed of an iron-based material, a coating layer does not have to be formed on a key part by using a lubricating material or the like. This can solve a problem such as separation, wear, etc. of the coating layer.

Ninth, since the first key is not exposed to outside of the slot while being received in the slot of the Oldham Ring during an orbiting motion of the orbiting scroll, a friction area of the key can be maintained constantly and a problem that surface pressure of the first key drastically increases can be solved.

Tenth, a shielding portion may be horizontally formed in a planar shape on one axial side of the slot to shield the one axial side of the slot. This can reinforce rigidity of the Oldham ring, in particular, rigidity of a surrounding portion of the slot.

In addition, the shielding portion closes the one axial side of the slot, such that oil can be introduced and stored in the slot. Accordingly, the oil stored in the slot can lubricate between the first key and the slot of the Oldham ring to reduce friction therebetween.

Eleventh, since the first key is fastened to the fixing groove by means of a fastening member such as a press-fit pin or screw, even if clearance is generated due to machining error and assembly error when assembling the fixing groove of the second scroll and the first key, the first key can be prevented from being twisted in the fixing groove. This can minimize loss of a compression chamber due to the generation of the clearance between a fixed wrap and an orbiting wrap.

The first key is formed of a different material from a material of the second scroll and is fastened to the second scroll by a fastening member. Accordingly, the first key can be prevented from being separated from or rotating in vain in the fixing groove of the second scroll due to a difference in thermal expansion coefficient between the second scroll and the first key.

DETAILED DESCRIPTION

Figure 1:
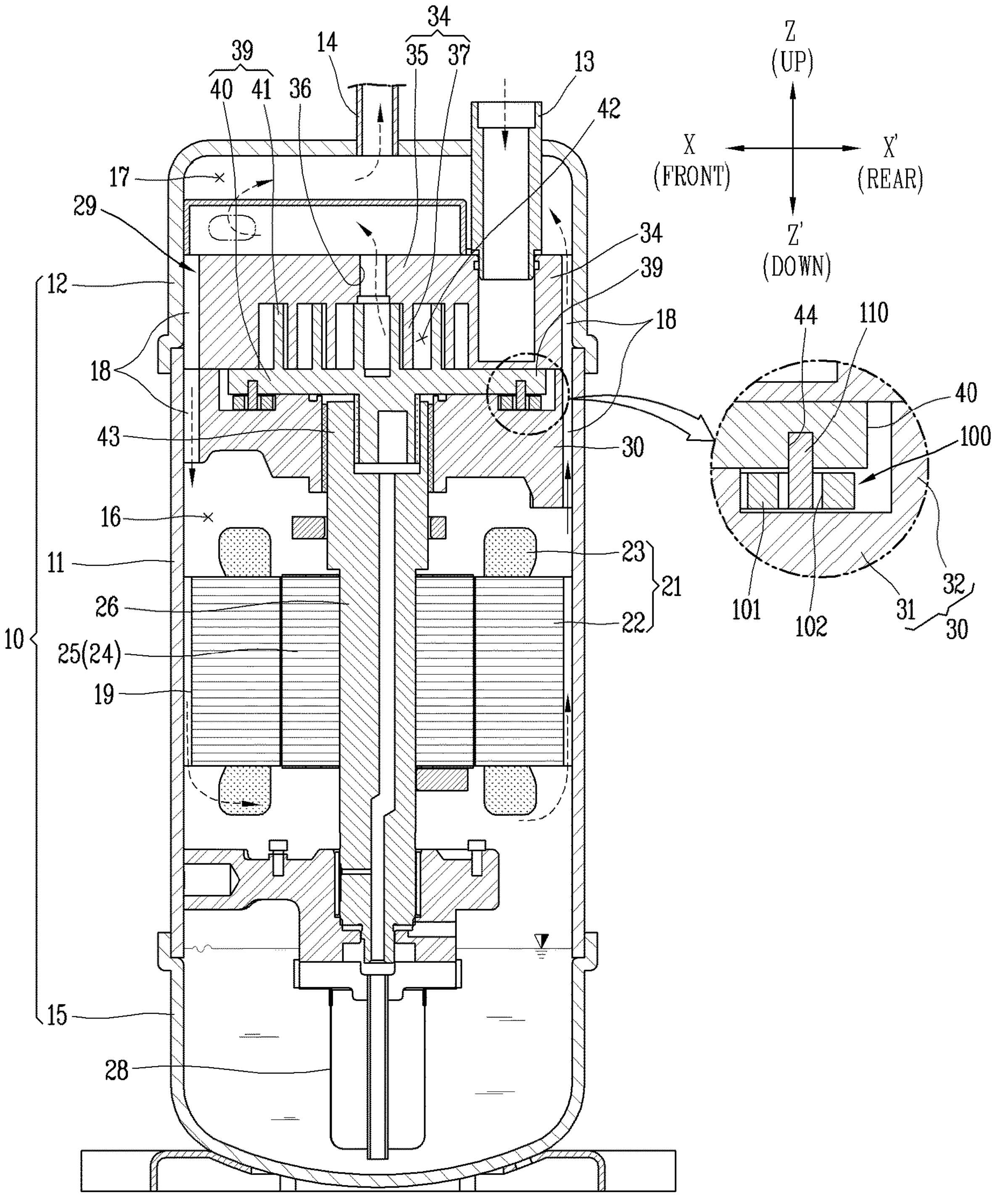
FIG. 1 is a conceptual view illustrating a cross-section of a scroll compressor in accordance with one embodiment of the present disclosure.

Hereinafter, a scroll compressor according to an embodiment of the present disclosure will be described in detail with reference to the accompanying drawings.

In the following description, a description of some components will be omitted to clarify features of the present disclosure.

1. Definition of Terms

It will be understood that when an element is referred to as being "connected with" another element, the element can be connected with the another element or intervening elements may also be present.

In contrast, when an element is referred to as being "directly connected with" another element, there are no intervening elements present.

A singular representation may include a plural representation unless it represents a definitely different meaning from the context.

The term "axial direction" used in the following description means an axial direction of a rotating shaft. The axial direction may be understood as the same concept as a vertical direction (Z-Z') illustrated in the drawings.

The term "radial direction" used in the following description means a radial direction of the rotating shaft. The radial direction may be understood as a front-rear direction (X-X') or a left-right direction (Y-Y') illustrated in the drawings. In particular, a first radial direction may be understood as the same concept as the front-rear direction. The second radial direction may be understood as the same concept as the left-right direction perpendicular to the first radial direction.

2. Description of Configuration of Scroll Compressor According to One Embodiment FIG. 1 is a conceptual view illustrating a cross-section of a scroll compressor in accordance with one embodiment of the present disclosure.

Figure 2:
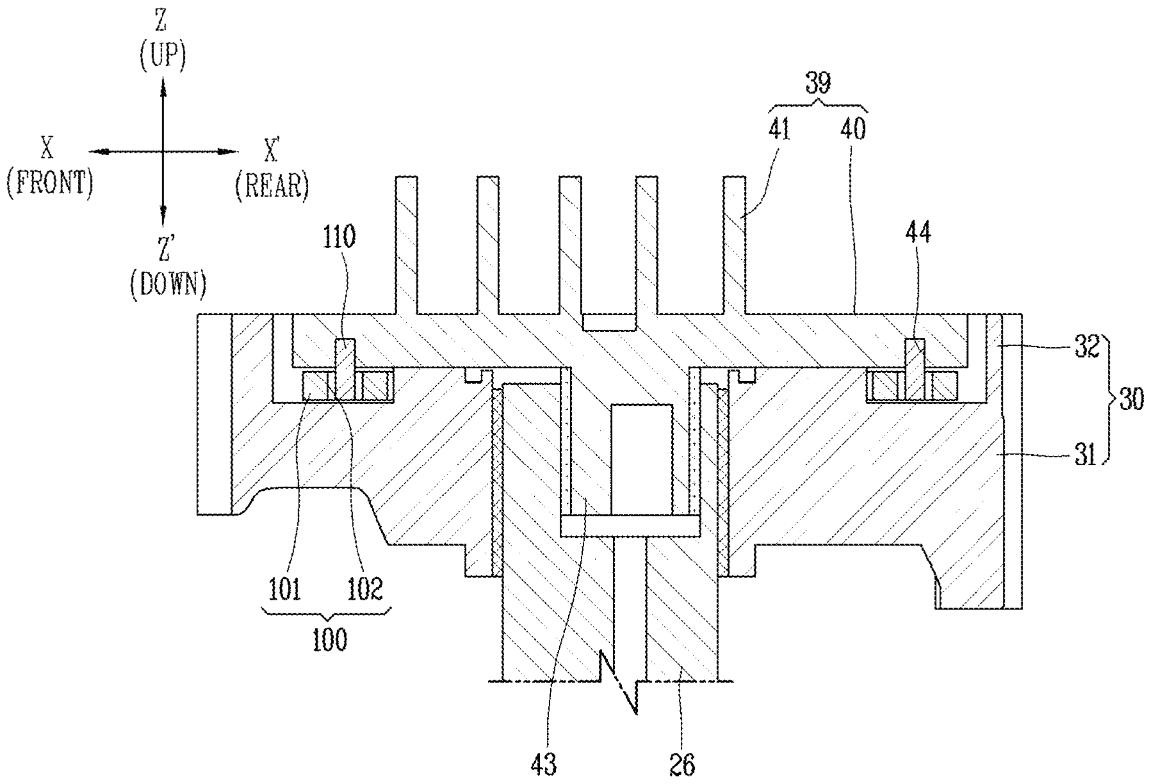
FIG. 2 is a conceptual view illustrating a structure in which a first key press-fitted to an orbiting scroll is slidable along a slot of an Oldham ring, in FIG. 1.

FIG. 2 is a conceptual view illustrating a structure in which a first key 110 press-fitted to an orbiting scroll 39 is slidable along a slot 102 of an Oldham ring 100, in FIG. 1.

Figure 3:
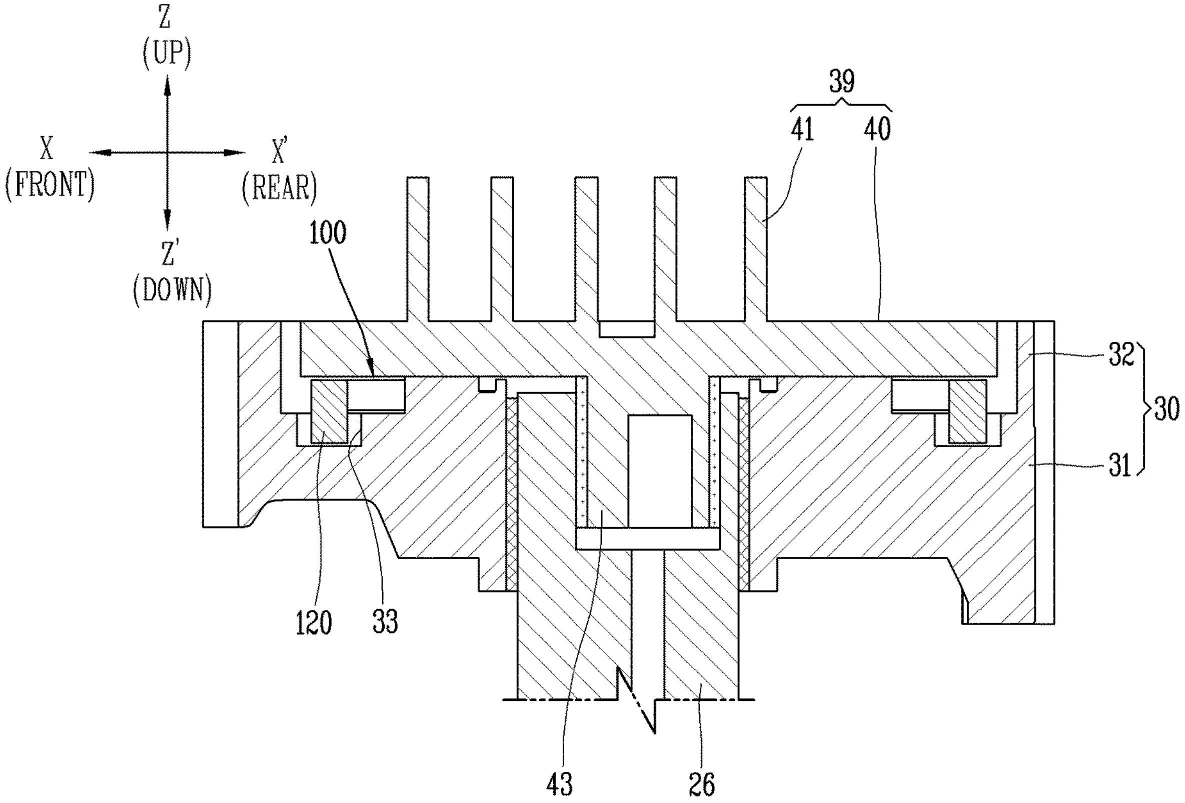
FIG. 3 is a conceptual view illustrating a structure in which a second key of the Oldham ring is slidable along a key groove of a frame, in FIG. 1.

FIG. 3 is a conceptual view illustrating a structure in which a second key 120 of the Oldham ring 100 is slidable along a key groove 33 of a frame 30, in FIG. 1.

Figure 4:
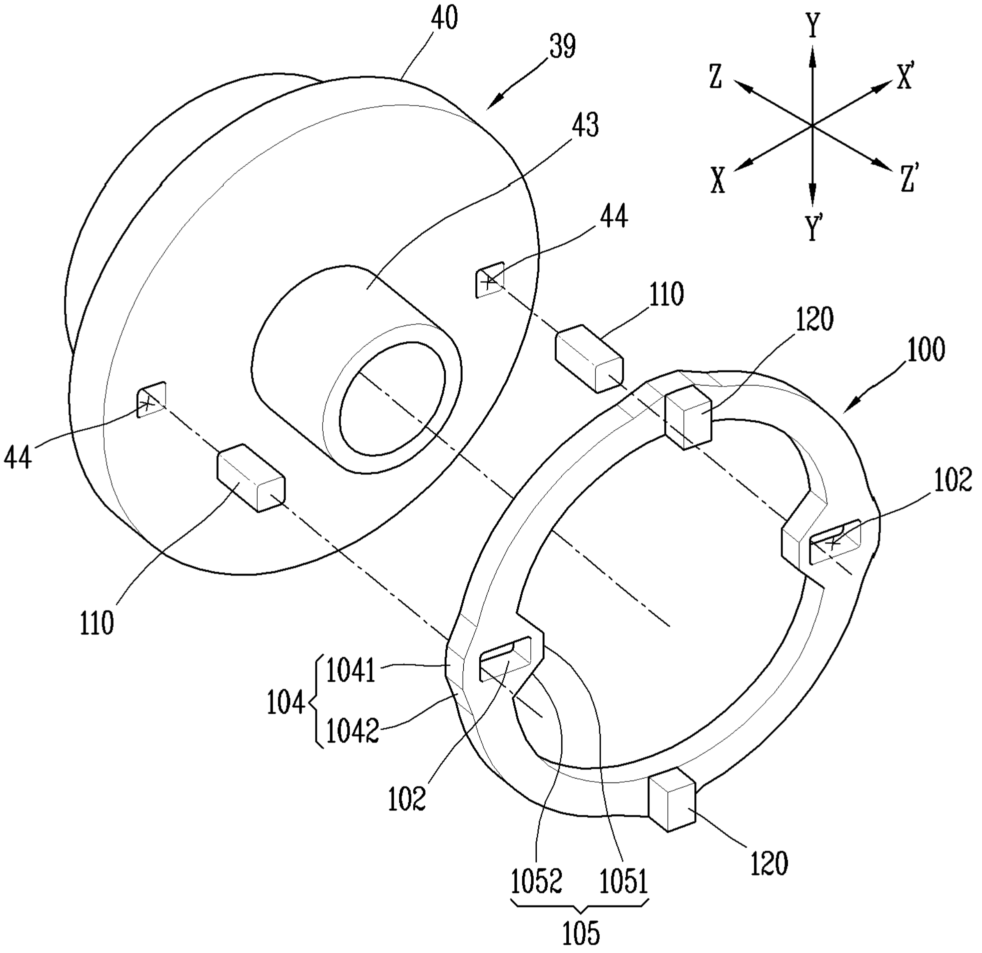
FIG. 4 is a conceptual view illustrating a state in which the Oldham ring is detached from the orbiting scroll, in FIG. 1.

FIG. 4 is a conceptual view illustrating a state in which the Oldham ring 100 is detached from the orbiting scroll 39, in FIG. 1.

Figure 5:
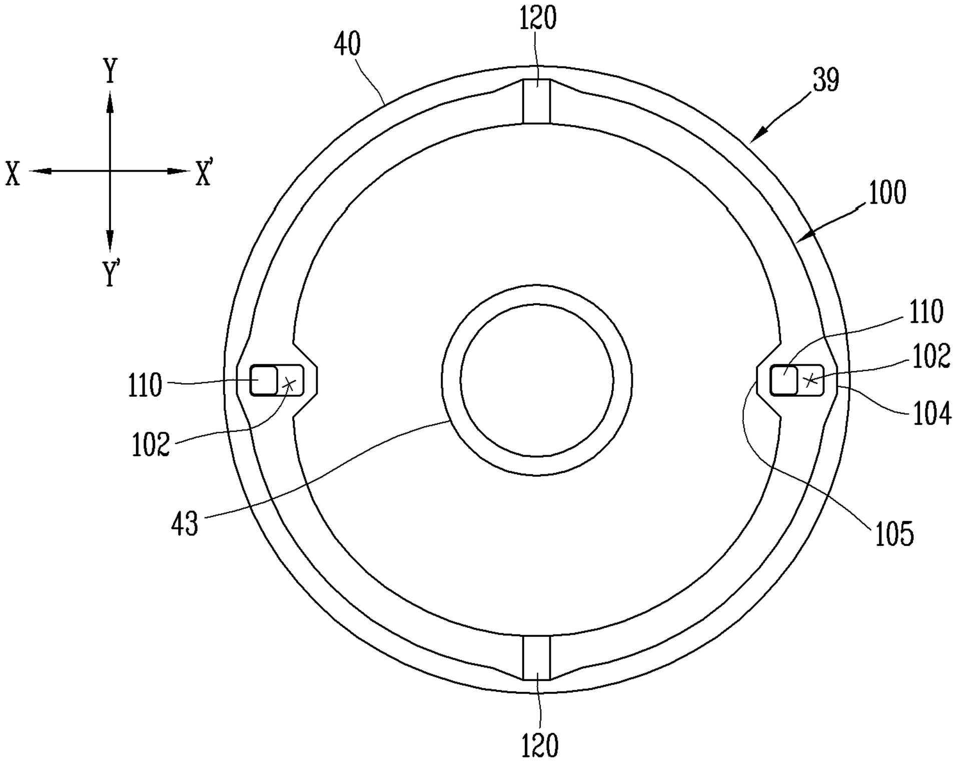
FIG. 5 is a bottom view illustrating a state in which a first key of the Oldham ring slides along the slot of the Oldham ring while press-fitted to the orbiting scroll, in FIG. 4.

FIG. 5 is a bottom view illustrating a state in which the first key 110 of the Oldham ring 100 slides along the slot 102 of the Oldham ring 100 while press-fitted to the orbiting scroll 39, in FIG. 4.

A scroll compressor according to an embodiment of the present disclosure includes a casing 10, a motor part 20, and a compression part 29.

Hereinafter, each configuration of the scroll compressor according to the embodiment will be described with reference to the accompanying drawings, and the Oldham ring 100 will be described as a separate clause.

(1) Casing 10

The casing 10 defines appearance of the compressor. The casing 10 may include a main housing 11, an upper housing 12, and a lower housing 15.

The main housing 11 is formed in a cylindrical shape. The main housing 11 may be formed in a vertical (up/down) direction in a penetrating manner. An accommodation space is defined inside the main housing 11.

The upper housing 12 may be coupled to an upper end portion of the main housing 11 to seal an upper end of the main housing 11.

The lower housing 15 may be coupled to a lower end portion of the main housing 11 to seal a lower end of the main housing 11.

The accommodation space of the main housing 11 may be sealed by the upper housing 12 and the lower housing 15.

A discharge pipe 14 for discharging refrigerant is provided in the upper housing 12.

The discharge pipe 14 may be disposed in an upper central portion of the upper housing 12 or a side surface of the upper housing 12. In this embodiment, the discharge pipe 14 is connected to the upper central portion of the upper housing 12 to protrude upward.

The discharge pipe 14 communicates with a second space 17 to be described later.

A suction pipe 13 for suctioning refrigerant may be provided in the upper housing 12 or the lower housing 15. This embodiment illustrates a structure in which the suction pipe 13 is disposed in the upper housing 12.

The suction pipe 13 may extend downward from one side of the upper housing 12 to communicate with a suction chamber of a compression space. The suction pipe 13 may be spaced apart from the discharge pipe 14 to one side. A through hole through which the suction pipe 13 is inserted may be formed to be spaced apart from the central portion of the upper housing 12 to one side. Refrigerant may be suctioned into a suction chamber of a compression chamber 42 through the suction pipe 13.

The compression chamber 42 is formed between an orbiting scroll 39 and a fixed scroll 34, which will be described later.

An inside of the casing 10 may be divided into a motor space (hereinafter, a first space 16) and an oil separation space (hereinafter, a second space 17) with the compression part 29 interposed therebetween.

The main housing 11 and the lower housing 15 may define the first space 16 together with one side surface of the compression part 29. The motor part 20 may be installed in the first space 16.

The upper housing 12 may define the second space 17 together with another side surface of the compression part 29. The second space 17 may be temporarily filled with refrigerant.

The first space 16 and the second space 17 may communicate with each other by a communication hole 18 and a communication groove 19.

The communication hole 18 is formed through an outer circumferential surface of the compression part 29 to be described later in an axial direction. The communication hole 18 may be provided in plurality spaced apart in the circumferential direction along the outer circumferential surface of the compression part 29.

The communication groove 19 is provided in plurality formed axially in a penetrating manner between an outer circumferential surface of the main housing 11 and an outer circumferential surface of a stator core 22 to be described later. The plurality of communication grooves 19 may be spaced apart from one another in a circumferential direction of the stator core 22.

The communication holes 18 and the communication grooves 19 may communicate with each other and may be disposed to be spaced apart from each other in the axial direction.

A portion of refrigerant discharged from the compression chamber 42 to the second space 17 may be discharged through the discharge pipe 14.

Another portion of the refrigerant may move from the compression space sequentially to the first space 16 and the second space 17, so as to be discharged through the discharge pipe 14.

Oil may be filled inside the lower housing 15 by a preset height.

(2) Motor Part 20

The motor part 20 generates rotational force. The motor part 20 may be implemented as a drive motor that receives electric energy and generates rotational force.

The motor part 20 is located inside the main housing 11. The motor part 20 includes a stator 21 and a rotor 24.

The stator 21 is fixedly disposed in the main housing 11. The stator 21 includes a stator core 22 and a stator coil 23. The stator core 22 may be formed by stacking a plurality of electrical steel sheets. The stator core 22 may be thermally press-fitted to an inner circumferential surface of the main housing 11.

A plurality of slots 102 are axially formed through the stator core 22.

The stator coil 23 is wound on the stator core 22 through the slots 102.

The rotor 24 is accommodated inside the stator 21 with an air gap therebetween. The rotor 24 is disposed to be rotatable relative to the stator 21.

The rotor 24 may include a rotor core 25 and a plurality of permanent magnets.

The rotor core 25 may be formed by stacking a plurality of electrical steel sheets. A plurality of magnet receiving holes may be axially formed through an inside of the rotor core 25.

The permanent magnets may be accommodated and fixed in magnet accommodation holes.

A shaft receiving hole may be axially formed through a central portion of the rotor core 25.

The rotating shaft 26 may be press-fitted to the shaft receiving hole of the rotor core 25.

The rotating shaft 26 may extend from the shaft receiving hole of the rotor core 25 to protrude upward.

With the configuration, when power is applied to the stator coil 23, a magnetic field is generated around the stator coil 23. The rotor 24 may generate rotational force by electromagnetic interaction with the stator 21.

The rotor 24 may rotate relative to the stator 21 centering on the rotating shaft 26.

The rotating shaft 26 may extend in the axial direction toward the compression part 29 in order to transmit the rotational force generated in the motor part 20 to the compression part 29. The rotating shaft 26 may be rotatably supported inside the frame 30 of the compression part 29 to be described later.

An oil passage 27 may be provided inside the rotating shaft 26. An oil pump 28 may be disposed beneath the rotating shaft 26. Oil may be pumped up by the oil pump 28 to the compression part 29 through the oil passage 27 inside the rotating shaft 26.

Since the oil pump 28 rotates together with the rotating shaft 26, oil stored in the lower housing 15 can be pumped into the oil passage 27 of the rotating shaft 26 by using centrifugal force or viscosity.

The rotating shaft 26 may be coupled to the orbiting scroll 39 of the compression part 29 to be described later, so that the rotational force of the motor part 20 can be transmitted to the orbiting scroll 39.

(3) Compression Part 29

The compression part 29 may be disposed above the motor part 20.

The compression part 29 compresses refrigerant by using the rotational force of the motor part 20.

The compression part 29 includes a frame 30, a fixed scroll (hereinafter, a first scroll 34), and an orbiting scroll (hereinafter, a second scroll 39). The fixed scroll 34 may be referred to as a first scroll 34. The orbiting scroll 39 may be referred to as a second scroll 39.

The frame 30 may be fixedly coupled to an upper open end portion of the main housing 11.

The first scroll 34 is fixedly supported on an upper surface of the frame 30. The first scroll 34 may be fixedly coupled to the casing 10 together with the frame 30.

The second scroll 39 is pivotably supported on the upper surface of the frame 30 to perform an orbiting motion between the first scroll 34 and the frame 30.

The second scroll 39 is eccentrically coupled to an eccentric shaft of the rotating shaft 26. The second scroll 39 forms a pair of compression chambers 42 each having a suction chamber, an intermediate pressure chamber, and a discharge chamber while performing an orbiting motion relative to the first scroll 34.

The frame 30 includes a frame end plate 31 and a frame side wall portion 32.

The frame end plate 31 may be formed in a disk shape.

The frame side wall portion 32 protrudes toward the first scroll 34 from an upper surface of the frame end plate 31. The frame side wall portion 32 may be coupled to a side wall portion 51 of the first scroll 34 to be described later.

A frame thrust surface may be formed horizontally on an inner side of the frame side wall portion 32. The second scroll 39 may be mounted on the frame thrust surface and supported in the axial direction. Here, the axial direction means an extension direction of the rotating shaft 26.

A back pressure space may be formed in a center of the frame thrust surface. A portion of refrigerant compressed in the compression chamber 42 may be filled in the back pressure space together with oil to support a rear surface (lower surface) of the second scroll 39.

An oil passage 27 may be defined inside the rotating shaft 26.

The oil passage 27 may extend axially from the rotating shaft 26. An upper end portion of the oil passage 27 may be connected to communicate with the back pressure space.

A shaft hole of the frame 30 through which the rotating shaft 26 is inserted is formed in the middle of the back pressure space. A first bearing (no reference numeral given) may be provided on an inner circumferential surface of the shaft hole of the frame 30.

The first bearing may be configured as a bush bearing. Alternatively, in some cases, it may be implemented as a ball bearing. However, compared to the ball bearing, the bush bearing can be advantageous in terms of cost because it is cheaper than the ball bearing, can be easy to be assembled, and can also reduce weight and noise.

Accordingly, pressure in the back pressure space forms intermediate pressure between pressure in the suction space and final pressure (i.e., discharge pressure) in the compression chamber 42.

A key groove 33 may be formed inside the frame thrust surface. A second key 120 of the Oldham ring 100 to be described later may be slidably inserted into the key groove 33 of the frame 30.

Meanwhile, the first scroll 34 may be fixedly coupled to the frame 30 or press-fitted to the casing 10.

The first scroll 34 may include a fixed scroll end plate (hereinafter, a first end plate 35), a fixed scroll side wall portion (hereinafter, a first side wall portion 37), and a fixed scroll wrap (hereinafter, a first wrap 38). The fixed scroll end plate 35 may be referred to as a first end plate 35. The fixed scroll side wall portion 37 may be referred to as a first side wall portion 37. The fixed scroll wrap 38 may be referred to as a fixed wrap or first wrap 38.

The first end plate 35 may be formed approximately in a disk shape.

The first side wall portion 37 may extend from a rim of the first end plate 35 along the circumferential direction. The first side wall portion 37 may extend downward from the first end plate 35 to be coupled to the frame side wall portion 32.

The first wrap 38 may protrude from a lower surface of the first end plate 35. The first wrap 38 may spirally extend from the lower surface of the first end plate 35 in a direction from a radially outside to a radially inner central portion.

The first wrap 38 may be engaged with an orbiting scroll wrap (hereinafter, a second wrap 41) to be described later.

A suction passage may be defined at one side of the first side wall portion 37 so that a suction space and a suction chamber (no reference numeral given) communicate with each other.

A discharge port 36 may be formed through a central portion of the first end plate 35. The discharge port 36 may be connected to communicate with the discharge chamber. Compressed refrigerant may be discharged to the discharge space or the oil separation space 17 through the discharge port 36.

Meanwhile, the second scroll 39 may be disposed between the frame 30 and the first scroll 34.

The second scroll 39 includes an orbiting scroll end plate (hereinafter, a second end plate 40), a second wrap 41, and a boss portion 43. The orbiting scroll end plate 40 may be referred to as a second end plate 40. The orbiting scroll wrap 41 may be referred to as an orbiting wrap or second wrap 41.

The second end plate 40 may be formed approximately in a disk shape.

The second wrap 41 may protrude upward from an upper surface of the second end plate 40 to face the lower surface of the first end plate 35. The second wrap 41 may be disposed to overlap the first wrap 38 in the radial direction and engaged with the first wrap 38.

The second wrap 41 may spirally extend from the lower surface of the second end plate 40 in a direction from a radially outside to a radially inner central portion.

The first wrap 38 and the second wrap 41 may be formed in an involute shape, but may also be formed in various other shapes.

A scroll thrust surface that defines the thrust surface together with the frame thrust surface may be formed on a rear surface (lower surface) of the second end plate 40.

However, since the second scroll 39 rises with respect to the frame 30 when the compressor is driven, the frame thrust surface and the scroll thrust surface do not substantially contact each other.

Rather, the frame 30 and the second scroll 39 form a thrust surface with a ring body 101 of the Oldham ring 100 to be described later.

The boss portion 43 may protrude downward from a central portion of a lower surface of the second end plate 40 toward the rotating shaft 26.

An eccentric shaft may protrude from an upper end portion of the rotating shaft 26. The eccentric shaft may protrude upward eccentrically from the center of the rotating shaft 26.

An eccentric shaft accommodating hole may be eccentrically formed in the boss portion 43.

Since the eccentric shaft is inserted into the eccentric shaft accommodating hole, the boss portion 43 may be eccentrically coupled to the eccentric shaft.

With this configuration, as the eccentric shaft of the rotating shaft 26 is eccentrically coupled to the boss portion 43 of the second scroll 39, the rotating shaft 26 can transmit the rotational force to the second scroll 39 of the compression part 29.

(4) One Embodiment of Oldham Ring 100

An anti-rotation mechanism is installed between the frame 30 and the second scroll 39 to prevent rotation of the second scroll 39. In some cases, the anti-rotation mechanism may alternatively be disposed between the first scroll 34 and the second scroll 39. Hereinafter, a case in which the anti-rotation mechanism is disposed between the frame 30 and the second scroll 39 will be described as an example.

As for the anti-rotation mechanism, a pin-and-ring type may be applied or an Oldham ring type may be applied. This embodiment relates to a case in which the Oldham ring type is applied.

The Oldham ring 100 is configured to prevent the second scroll 39 from rotating.

Since the Oldham ring 100 prevents the second scroll 39 from rotating, the second scroll 39 can pivot relative to the first scroll 34 along with the rotation of the rotating shaft 26.

Meanwhile, the scroll compressor may also be applied to an air conditioning system that controls humidity and temperature of air using a refrigeration cycle or a home appliance such as a refrigerator that generates cool air.

In order to improve motor efficiency of the scroll compressor, the Oldham ring 100 as well as the orbiting scroll 39 may be made of a lightweight material such as aluminum (aluminum alloy).

However, as described above, when the Oldham ring 100 and the frame 30 or the orbiting scroll 39 that is in contact with the Oldham ring 100 are formed of an aluminum material, deterioration of friction characteristics may be seriously caused due to the same type of material, unlike cast iron.

In consideration of this, a method in which a ring part and a key part of the Oldham ring 100 are formed of different materials and assembled to each other or a method of forming the entire Oldham ring 100 with a single (same) material and thereafter forming a coating layer on a surface of the Oldham ring 100 to improve friction characteristics may be taken into account.

However, as described above, these methods have limitations in machinability and reliability.

Therefore, the present disclosure desires to enhance machinability for the Oldham ring 100 by forming the entire Oldham ring 100 with a single material, i.e., aluminum, and simultaneously secure reliability of the compressor by forming the orbiting scroll 39, to which the Oldham ring 100 is coupled, with the same material as the Oldham ring 100 to prevent beforehand deterioration of friction characteristics due to the use of the same material.

In this embodiment, the frame 30 may be formed of an iron-based material.

To this end, the first key 110 is disposed on the second scroll 39. The first key may be mounted on the second end plate 40. Two of the first keys 110 may be mounted on the second end plate 40 of the second scroll 39.

The plurality of first keys 110 may be disposed on the second end plate 40 of the second scroll 39 to be spaced apart from each other in the circumferential direction. The plurality of first keys 110 may be spaced apart from each other at an interval of 180 degrees in the circumferential direction. The plurality of first keys 110 may be radially spaced apart from each other at the interval of 180 degrees at opposite sides on the second end plate 40. The first keys 110 may be disposed on a middle of the scroll thrust surface of the second scroll 39.

The first key 110 may have a bar-like shape that has a solid rectangular cross-section and extends long in the vertical (up/down) direction. The cross-sectional shape of the first key 110 is not limited to the rectangular shape but may alternatively be formed in a circular shape. However, the first key 110 is preferably formed in a rectangular shape to be prevented from rotating in vain due to getting twisted in the fixing groove 44 in the circumferential direction.

The first key 110 may be press-fitted to the second end plate 40. An upper side of the first key 110 may be fixedly inserted into the second end plate 40 in a thickness direction, and a lower side of the first key 110 may protrude downward from the lower surface of the second end plate 40.

The plurality of first keys 110 may protrude from the lower surface of the second end plate 40 toward the slot 102 of the Oldham ring 100.

A fixing groove 44 for fixing the first key 110 to the second end plate 40 may be formed to be recessed in the second end plate 40 in the thickness direction. The fixing groove 44 may have a rectangular cross-sectional shape. Corners of the rectangular fixing groove 44 may be rounded.

A cross-sectional aera of the fixing groove 44 may be the same as a cross-sectional area of the first key 110.

A depth of the fixing groove 44 may be smaller than a thickness of the second end plate 40. The depth of the fixing groove 44 is smaller than a length of the first key 110.

With this configuration, the first key 110 can be press-fitted to the second end plate 40.

Since the first key 110 is press-fitted to the second end plate 40, the first key 110 can be fixed in the second end plate 40 with its movement limited in the vertical (axial) direction or in front-rear and left-right directions (radial direction).

The first key 110 may operate integrally with the second scroll 39.

The first key 110 may be formed of a material different from that of the second scroll 39 and the Oldham ring 100. For example, the first key 110 may be made of an iron-based material. The first key 110 may be formed of cast iron (including cast iron alloy) or an iron-based sintered alloy.

The Oldham ring 100 may include a ring body 101, a slot 102, and a second key 120.

The ring body 101 may be formed in a circular ring shape. The ring body 101 includes an outer circumferential surface, an inner circumferential surface, one axial side surface and another axial side surface.

The outer circumferential surface of the ring body 101 is formed in a curved shape having a predetermined curvature in the circumferential direction along an outermost circumference of the ring body 101. The inner circumferential surface of the ring body 101 is formed in a curved shape having a predetermined curvature in the circumferential direction along an innermost circumference of the ring body 101.

The outer and inner circumferential surfaces of the ring body 101 are closed curved surfaces.

The one axial side surface (Z direction, upper surface) of the ring body 101 faces the second end plate 40 of the second scroll 39 and is formed as a horizontal plane.

The another axial side surface (Z' direction, lower surface) of the ring body 101 faces an opposite side of the second end plate 40 and is formed as the horizontal plane.

A plurality of first protrusions 104 may be provided on the outer circumferential surface of the ring body 101. The plurality of first protrusions 104 protrude radially outward from the outer circumferential surface. each of the first protrusions 104 may include a first planar portion 1041 and a plurality of first inclined portions 1042.

The first planar portion 1041 is formed to be planar in a tangential direction with respect to the outer circumferential surface of the ring body 101.

The plurality of first inclined portions 1042 are disposed at both sides of the first planar portion 1041 with the first planar portion 1041 interposed therebetween. One end of each of the first inclined portions 1042 is connected to the first planar portion 1041, and another end of the first inclined portion 1042 is connected to the outer circumferential surface of the ring body 101. The first inclined portion 1042 is inclined radially outward from the outer circumferential surface toward the first planar portion 1041.

The plurality of first protrusions 104 are spaced apart from each other at an equal interval in the circumferential direction along the outer circumferential surface of the ring body 101. The plurality of first protrusions 104 may be four that are disposed to be spaced apart from one another at intervals of 90 degrees.

A plurality of second protrusions 105 may be provided on the inner circumferential surface of the ring body 101.

Each of the plurality of second protrusions 105 may include a second planar portion 1051 and a plurality of second inclined portions 1052.

The second planar portion 1051 is disposed radially more inward than the inner circumferential surface of the ring body 101. The second planar portion 1051 is formed to be planar in the tangential direction of the inner circumferential surface.

One end of each of the second inclined portions 1052 is connected to the second planar portion 1051, and another end of the second inclined portion 1052 is connected to the inner circumferential surface of the ring body 101. The second inclined portion 1052 is inclined radially inward from the inner circumferential surface of the ring body 101 toward the second planar portion 1051.

The second protrusion 105 has a longer protrusion length than the first protrusion 104.

The second inclined portion 1052 has a greater inclination than the first inclined portion 1042.

The plurality of second inclined portions 1052 may be spaced apart from each other at an interval of 180 degrees along the inner circumferential surface of the ring body 101.

The plurality of second protrusions 105 may be disposed to radially face some of the plurality of first protrusions 104.

According to this configuration, a radial width of the axial side surface of the ring body 101 is the widest between the first protrusion 104 and the second protrusion 105.

The radial width between the first protrusion 104 and the second protrusion 105 is wider than a radial width between the first protrusion 104 and the inner circumferential surface of the ring body 101.

The plurality of slots 102 may be formed in a radially elongated rectangular shape in the axial side surface of the ring body 101. The plurality of slots 102 may be formed through the ring body 101 in a thickness direction or axial direction of the ring body 101. Each corner of the slot 102 may be rounded into a curved shape.

The plurality of slots 102 are disposed between the plurality of first protrusions 104 and second protrusions 105, respectively.

The slot 102 may extend long in the radial direction of the ring body 101 between the first protrusion 104 and the second protrusion 105. A radial length (longitudinal) of the slot 102 may be longer than its width (transverse).

A radial side surface and a widthwise side surface of the slot 102 may be disposed perpendicular to each other. The widthwise side surface of the slot 102 may be formed parallel to the first planar portion 1041 of the first protrusion 104 and the second planar portion 1051 of the second protrusion 105.

The first key 110 is received inside the slot 102. A length of the first key 110 may be shorter than or equal to a depth of the fixing groove 44 and an axial depth of the slot 102.

The first key 110 is disposed to be slidable along an inner surface of the slot 102.

In a rectangular cross-section of the first key 110, a transverse or longitudinal length of the first key 110 is formed to be the same as or almost similar to the width of the slot 102. A transverse side surface or longitudinal side surface of the first key 110 is made to be in surface contact with the radial side surface of the slot 102.

The transverse or longitudinal length of the first key 110 may be formed to be about half the radial length of the slot 102.

A transverse length of the slot 102 may be about half a longitudinal length of the slot 102.

The first key 110 may slide in the radial direction of the ring body 101 along the slot 102. According to this configuration, the orbiting scroll 39 can perform a relative motion (sliding motion) with respect to the Oldham ring 100.

The plurality of second keys 120 protrude toward the frame end plate 31 from the another axial side surface of the ring body 101 that faces the opposite side to the orbiting scroll 39.

The second key 120 may be formed in a rectangular shape. A longitudinal length of the second key 120 in the radial direction may be longer than its transverse length in the widthwise direction.

The second key 120 may be disposed between the first protrusion 104 and the inner circumferential surface of the ring body 101.

The plurality of second keys 120 may be disposed to be spaced apart from the plurality of first keys 110 at intervals of 90 degrees in the circumferential direction. The plurality of second keys 120 may be disposed to be spaced apart from the plurality of first keys 110 at intervals of 90 degrees in the circumferential direction.

A plurality of key grooves 33 are recessed in the frame end plate 31 in the thickness direction or the axial direction.

The plurality of key grooves 33 may extend long in the radial direction of the frame end plate 31.

The second key 120 may be received in the key groove 33 of the frame 30. The second key 120 may be disposed to be radially slidable along the key groove 33.

The key grooves 33 and the slots 102 may be alternately disposed to be spaced apart from each other at intervals of 90 degrees in the circumferential direction of the ring body 101. The key groove 33 and the slot 102 may be perpendicularly disposed.

As the second key 120 slides along the key groove 33 of the frame 30, the Oldham ring 100 may perform a relative motion (sliding motion in the radial direction) relative to the frame 30.

The plurality of first keys 110 and second keys 120 may be alternately disposed to be spaced apart from each other in the circumferential direction of the ring body 101.

Sliding directions of the first key 110 and the second key 120 may be made perpendicular to each other.

The first key 110 may slide along the slot 102 of the Oldham ring 100 in a first radial direction, and the second key 120 may slide along the key groove 33 of the frame 30 in a second radial direction perpendicular to the first radial direction.

The first radial direction may be understood as the same concept as a front-rear direction (X-X' direction). The second radial direction may be understood as the same concept as a left-right direction (Y-Y' direction).

The second scroll 39 may slide relative to the Oldham ring 100 in the first radial direction, and the Oldham ring 100 may slide relative to the frame 30 in the second radial direction.

According to this, the Oldham ring 100 can prevent the second scroll 39 from rotating, so that the second scroll 39 can perform an orbiting motion relative to the first scroll 34 with being engaged with the first scroll 34 without rotating centering on the first scroll 34.

Therefore, according to the present disclosure, the Oldham ring 100 can be formed of an aluminum material that is the same as the material of the orbiting scroll 39, thereby improving motor efficiency by reducing a weight of the Oldham ring 100.

In addition, the first key 110 protrudes from the lower surface of the orbiting scroll 39 toward the Oldham ring 100. The first key 110 may slide along the slot 102 while being received in the slot 102 formed in the Oldham ring 100. The first key 110 is formed of an iron-based material that is different from the material of the orbiting scroll 39.

According to this configuration, even if the Oldham ring 100 is made of the same material as the orbiting scroll 39, only the first key 110 of the orbiting scroll 39 that rubs against the slot 102 of the Oldham ring 100 can be made of the iron-based material that is different from the material of the orbiting scroll 39, thereby improving friction/wear characteristics.

This is not a structure in which a first key covers at least one side surface of a fixing protrusion protruding from one axial side surface of an Oldham ring, but an integrated structure in which the first key 110 protrudes from the second end plate 40 of the orbiting scroll 39 to be received in the slot 102 of the Oldham ring 100. This can increase support stiffness and rigidity of the first key 110 without reducing the thickness of the first key 110.

In addition, the transverse or longitudinal length of the first key 110 may be the same as or similar to the width of the slot 102.

In addition, since the first key 110 does not have the structure in which the first key 110 is coupled to the fixing protrusion protruding from the one axial side surface of the Oldham ring 100, a generation of clearance due to a machining error and an assembly error between the fixing protrusion and the first key 110 of the Oldham ring 100 can be prevented.

In addition, the first key 110 is press-fitted into the fixing groove 44 formed in the second end plate 40 of the orbiting scroll 39. Accordingly, a height of the first key 110 is not limited to a height of the fixing protrusion protruding from the one axial side surface of the Oldham ring 100, and a deep depth or wide width of the first key 110 that is press-fitted or bonded to the orbiting scroll 39 can be secured.

In addition, since the first key 110 has a rectangular cross-sectional shape, the first key 110 can be prevented from being separated from or rotating in vain in the fixing groove 44.

Moreover, since the orbiting scroll 39 into which the first key 110 is press-fitted is made of aluminum, machining convenience or precision for the fixing groove 44 of the orbiting scroll 39 into which the first key 110 is press-fitted can increase.

Since the first key 110 is formed of the iron-based material, a coating layer does not have to be formed on the key part by using a lubricating material or the like. This can solve a problem such as separation, wear, etc. of the coating layer.

While the orbiting scroll 39 pivots, the first key 110 is not exposed to the outside of the slot 102 in a state where it is received in the slot 102 of the Oldham ring 100. Therefore, a friction area of the key can be constantly maintained and a drastic increase in surface pressure of the first key 110 can be solved.

(5) Another Embodiment of Oldham Ring 200

Figure 6:
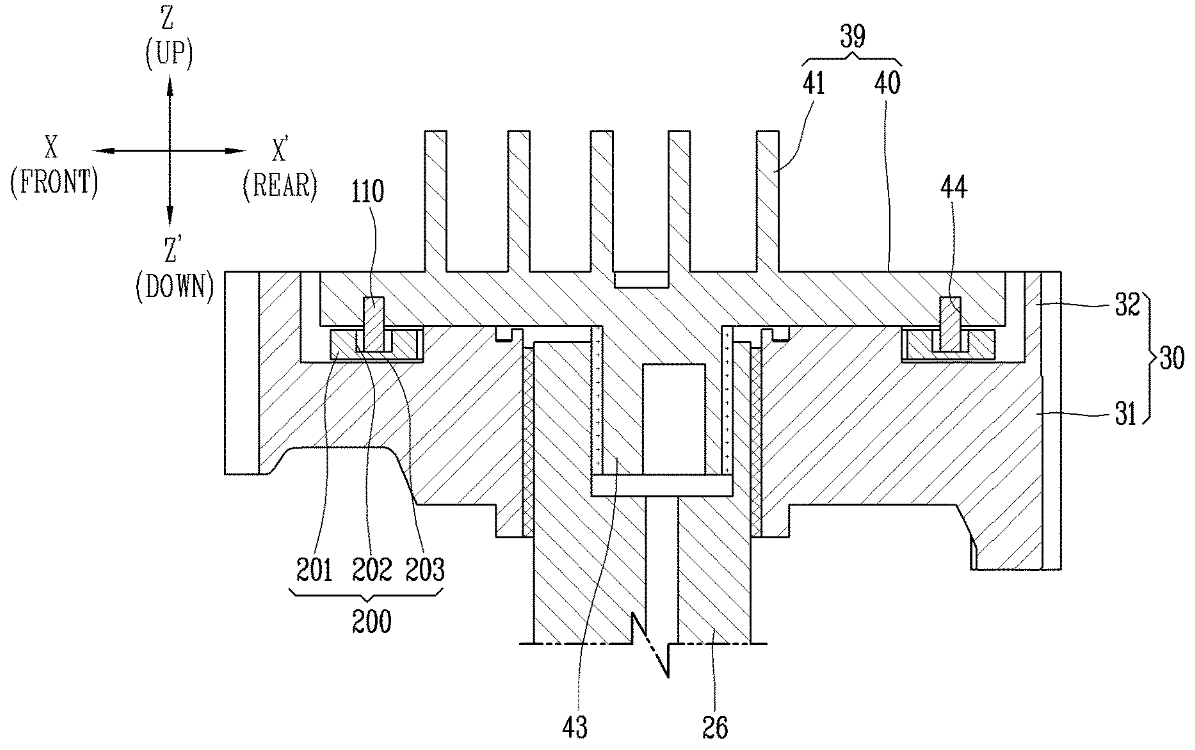
FIG. 6 is a conceptual view illustrating a structure in which one axial side of a slot is closed, in another embodiment of an Oldham ring according to the present disclosure.

FIG. 6 is a conceptual view illustrating a structure in which one axial side of a slot 202 is closed, in another embodiment of an Oldham ring 200 according to the present disclosure.

Figure 7:
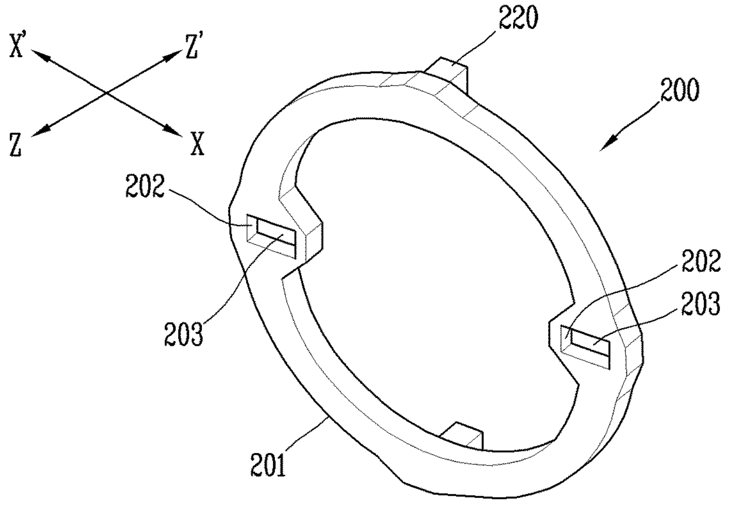
FIG. 7 is a partially enlarged view illustrating a state in which the one axial side of the slot is closed in FIG. 6.

FIG. 7 is a partially enlarged view illustrating a state in which one axial side of the slot 202 is closed in FIG. 6.

This embodiment is different from the embodiment of FIGS. 1 to 5 in terms of a structure in which the slot 202 of the Oldham ring 200 is axially open toward the first key 110 and closed toward the frame 30.

The one axial side of the slot 202 may be formed in a closed structure with respect to the frame 30.

A shielding portion 203 may be formed horizontally in a planar shape, while maintaining a predetermined thickness, on one axial side of the slot 202 to shield the one axial side of the slot 202.

According to this configuration, the shielding portion 203 can increase rigidity of the Oldham ring 200, in particular, rigidity of a surrounding portion of the slot 202.

In addition, the shielding portion 203 closes the one axial side of the slot 202, such that oil can be introduced and stored in the slot 202. Accordingly, the oil stored in the slot 202 can lubricate between the first key 110 and the slot 202 of the Oldham ring 200 to suppress friction therebetween.

Since other components are the same as or similar to those in the embodiment of FIGS. 1 to 5, duplicated descriptions will be omitted.

In the embodiment illustrated in FIGS. 6 and 7, the frame 30 may be formed of an iron-based material such as cast iron.

(6) Still Another Embodiment of Oldham Ring 300

Figure 8:
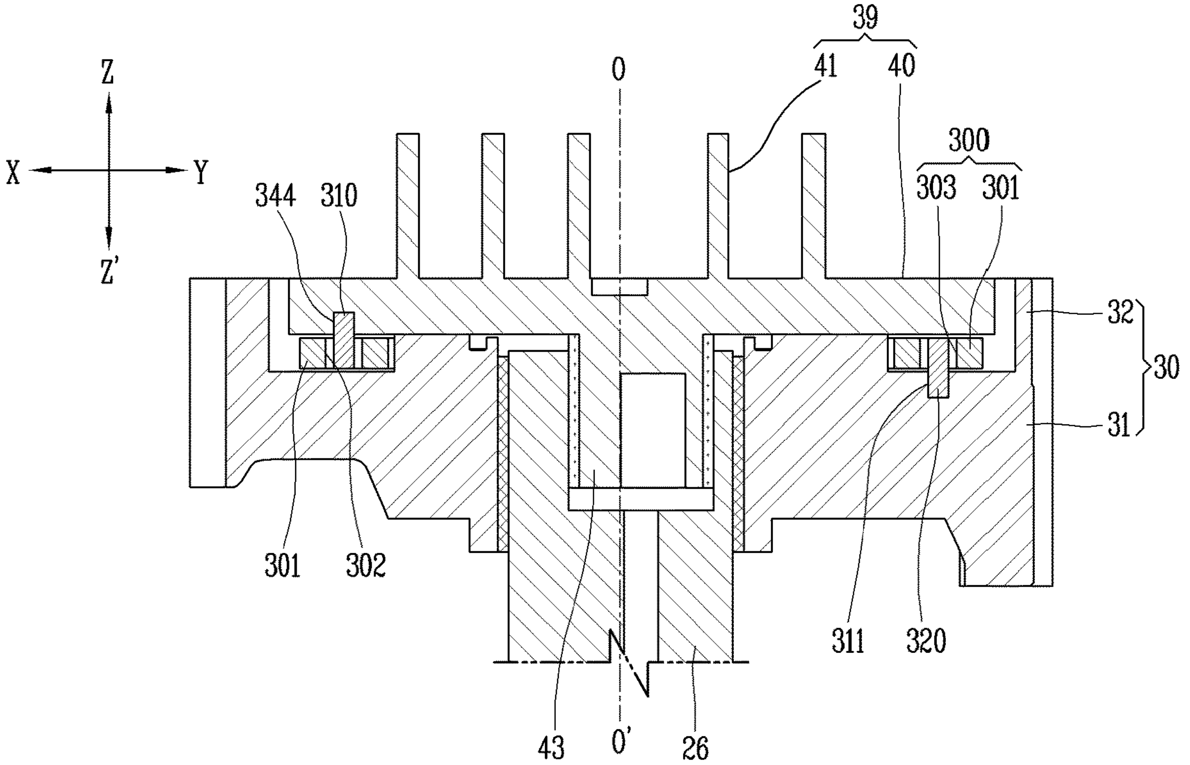
FIG. 8 is a conceptual view illustrating a state in which a first key and a second key are received in a slot of an Oldham ring, in still another embodiment of an Oldham ring according to the present disclosure.

FIG. 8 is a conceptual view illustrating a state in which a first key 310 and a second key 320 are received in a first slot 302 and a second slot 303 of an Oldham ring 300, in still another embodiment of the Oldham ring 300 according to the present disclosure.

Figure 9:
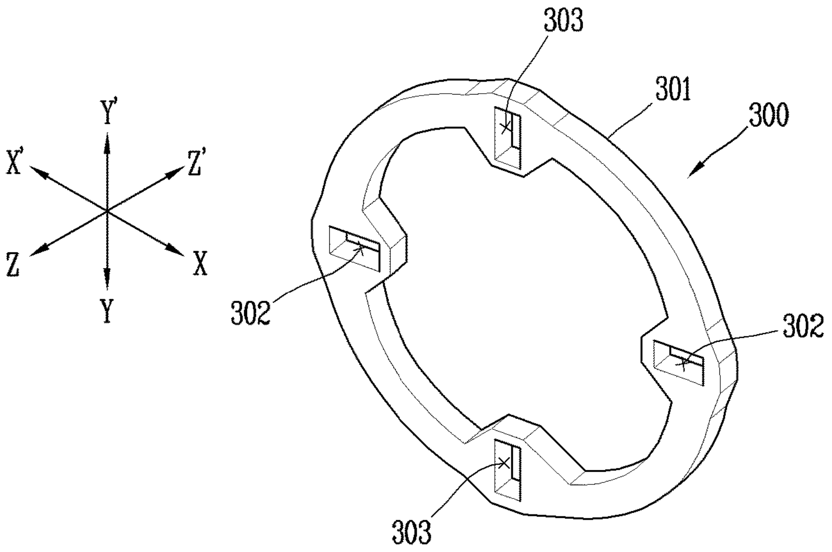
FIG. 9 is a perspective view illustrating a state in which a plurality of slots are formed through the Oldham ring in an axial direction in FIG. 8.

FIG. 9 is a perspective view illustrating a state in which a plurality of first and second slots 302 and 303 are formed through the Oldham ring 300 in the axial direction in FIG. 8.

In FIG. 8, a left side based on an axial center line O-O' of a rotating shaft is a cross-sectional view illustrating a state in which the first key 310 disposed on the second scroll 39 is received in the first slot 302 of the Oldham ring 300, and a right side is a cross-sectional view illustrating a state in which the second key 320 disposed on the frame 30 is received in the second slot 303 of the Oldham ring 300. The left cross-section and the right cross-section are perpendicular to each other.

In this embodiment, the Oldham ring 300 is different from the embodiments of FIGS. 1 to 7 in that the Oldham ring 300 includes a plurality of first slots 302 and a plurality of second slots 303 without having the second key 320 disposed on a ring body 301.

The plurality of first slots 302 may be spaced apart from each other at an interval of 180 degrees in the circumferential direction of the ring body 301. The first key 310 may be press-fitted to the scroll thrust surface of the second scroll 39 toward an opposite side to the first scroll 34.

A first fixing groove 344 may be formed in the second end plate 40. The first key 310 may be press-fitted to the first fixing groove 344.

The first key 310 may be received in the first slot 302, to slide along the first slot 302 during the orbiting motion of the second scroll 39.

The plurality of second slots 303 may be perpendicular to the plurality of first slots 302. The plurality of second slots 303 may be spaced apart from each other at an interval of 180 degrees in the circumferential direction of the ring body 301.

The plurality of first keys 310 and the plurality of second keys 320 may be alternately disposed to be spaced apart from each other at an equal interval in the circumferential direction of the ring body 301.

The first slot 302 and the second slot 303 may be formed through the ring body 301 in a thickness direction or axial direction of the ring body 301.

A first shielding portion may be further formed on one axial side of the first slot 302 to shield one side of the first slot 302 facing the frame end plate 31 (not illustrated).

A second shielding portion may be further formed on another axial side of the second slot 303 to shield another side of the second slot 303 facing the second end plate 40 of the second scroll 39.

The second key 320 may be press-fitted to the frame end plate 31 or may be integrally formed with the frame end plate 31.

This embodiment illustrates the state in which the second key 320 is press-fitted to the frame end plate 31. A second fixing groove 311 may be formed in the frame end plate. The second key 320 may be press-fitted to the second fixing groove 311.

The second key 320 may be received in the second slot 303, to slide in a contact state with a side surface of the second key 320 during the orbiting motion of the second scroll 39.

According to this configuration, while the second scroll 39 performs the orbiting motion, the first key 310 can slide in the first radial direction along the first slot 302 and the second scroll 39 can move relative to the Oldham ring 300 in the first radial direction.

In addition, the second slot 303 of the Oldham ring 300 can slide in the second radial direction in a contact state with the second key 320, and the Oldham ring 300 can move relative to the frame 30 in the second radial direction that is perpendicular to the first radial direction.

Accordingly, the Oldham ring 300 can prevent the second scroll 39 from rotating, so that the second scroll 39 can pivot relative to the first scroll 34.

In this embodiment, the frame 30 may be formed of aluminum that is the same material as that of the second scroll 39 and the Oldham ring 300.

The first key 310 and the second key 320 may be formed of an iron-based material that is different from the material of the orbiting scroll 39, the frame 30, and the like.

According to the Oldham ring structure of this embodiment, the plurality of first slots and the plurality of second slots can be disposed with a phase difference of a 90-degree interval in the annular ring body or integrally connected to the ring body. This can simplify assembling between the first key and the second key that are disposed on the orbiting scroll and the frame, respectively, compared to the existing pin-and-ring type anti-rotation mechanism.

Since other components are the same as or similar to those in the embodiments of FIGS. 1 to 7, duplicated descriptions will be omitted.

(7) Various Embodiments Related to Fastening Structure of First Key 110

Figure 10:
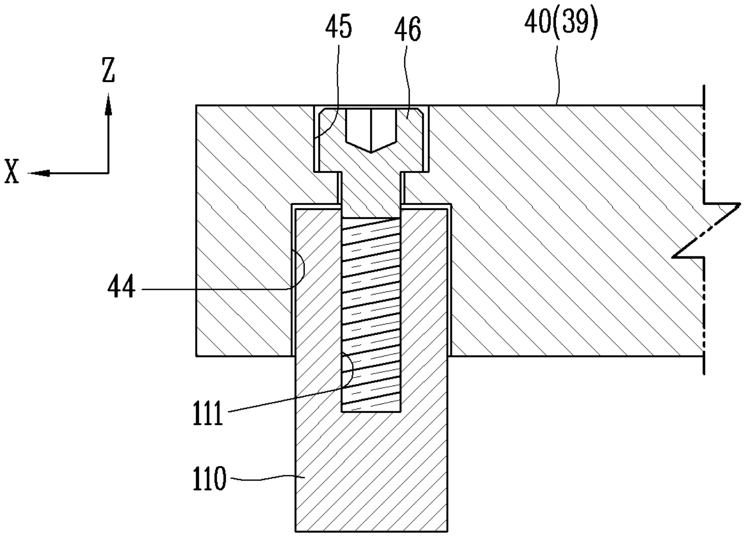
FIG. 10 is a conceptual view illustrating a state in which the first key is coupled to an orbiting scroll by a bolt.

① FIG. 10 is a conceptual view illustrating a state in which the first key 110 is coupled to the orbiting scroll 39 by a bolt.

This embodiment is different from the embodiments of FIGS. 1 to 9 in that the first key 110 is coupled to the second scroll 39 by a fastening member 46 such as a screw or the like.

A fastening groove 47 may be recessed axially in one side of the first key 110.

A first fastening hole 45 may be disposed on the second end plate 40 of the second scroll 39. The first fastening hole 45 may be formed through the second end plate 40 in the thickness direction to communicate with the fixing groove 44.

The first key 110 can be inserted into the fixing groove 44 of the second end plate 40, and the screw can be inserted and fastened into the fastening groove 47 of the first key 110 through the first fastening hole 45.

The first fastening hole 45 may be recessed into the second end plate 40 of the second scroll 39 to face the first scroll 34. A head of the screw may be received in the first fastening hole 45, so as to be buried inside the second end plate 40.

Since other components are the same as or similar to those in the embodiments of FIGS. 1 to 9, duplicated descriptions will be omitted.

Figure 11:
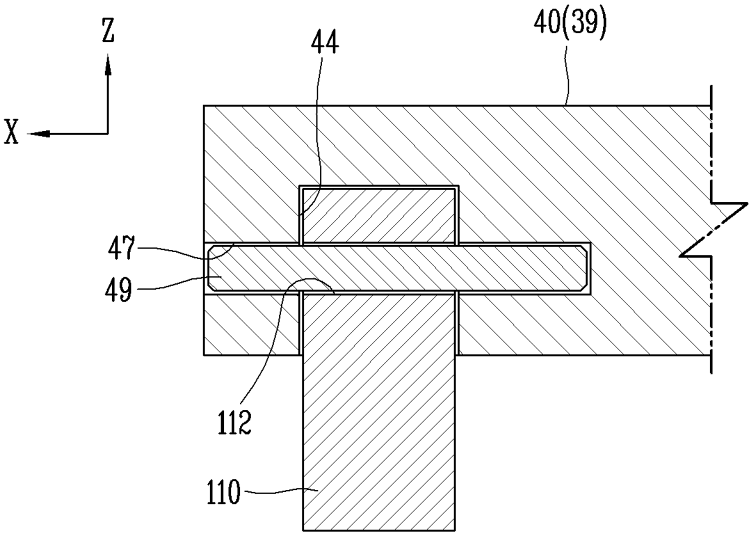
FIG. 11 is a conceptual view illustrating a state in which the first key is coupled to the orbiting scroll by a press-fit pin.

② FIG. 11 is a conceptual view illustrating a state in which the first key 110 is coupled to the orbiting scroll 39 by a press-fit pin 49.

This embodiment is different from the embodiments of FIGS. 1 to 9 in that the first key 110 is coupled to the second scroll 39 by a fastening member 46 such as a press-fit pin 49.

A second fastening hole 112 may be formed through one side of the first key 110 in the radial direction.

A fastening groove 47 may be disposed in the second end plate 40 of the second scroll 39. The fastening groove 47 may extend radially in the second end plate 40 to communicate with the fixing groove 44. The fastening groove 47 may extend in a direction of crossing the fixing groove 44 in the radial direction.

An outer side of the fastening groove 47 may be connected to communicate with an outer side of the second end plate 40.

The first key 110 and the second end plate 40 can be fastened by inserting the first key 110 into the fixing groove 44 of the second end plate 40 and inserting the press-fit pin 49 through the second fastening hole 112 of the first key 110 via the fastening groove 47 of the second end plate 40.

The press-fit pin 49 may be installed to be buried inside the second end plate 40.

According to this configuration, even if a clearance is generated due to a machining error and an assembly error when assembling the fixing groove 39 of the second scroll 39 and the first key 110, the first key 1110 can be fastened to the fixing groove 44 by the fastening member 46 (or the press-fit pin 49), thereby preventing the first key 110 from being twisted in the fixing groove 44. This can minimize loss of the compression chamber 42 due to the generation of the clearance between the fixed wrap 38 and the orbiting wrap 41.

As the first key 110 is formed of the different material from that of the second scroll 39, and is fastened to the second scroll 39 by the fastening member 46 (or the press-fit pin 49), the problem that the first key 110 is separated from or rotates in vain in the fixing groove 44 due to a difference in thermal expansion coefficient between the second scroll 39 and the first key 110 can be prevented.

Since other components are the same as or similar to those in the embodiments of FIGS. 1 to 9, duplicated descriptions will be omitted.

(8) Embodiment of a Structure that a First Key Groove Forming Part 54, which is Formed of a Different Material from a Material of the Orbiting Scroll 39 and Receives Therein a First Key 410 of an Oldham Ring 400, is Applied to the Orbiting Scroll 39

Figure 12:
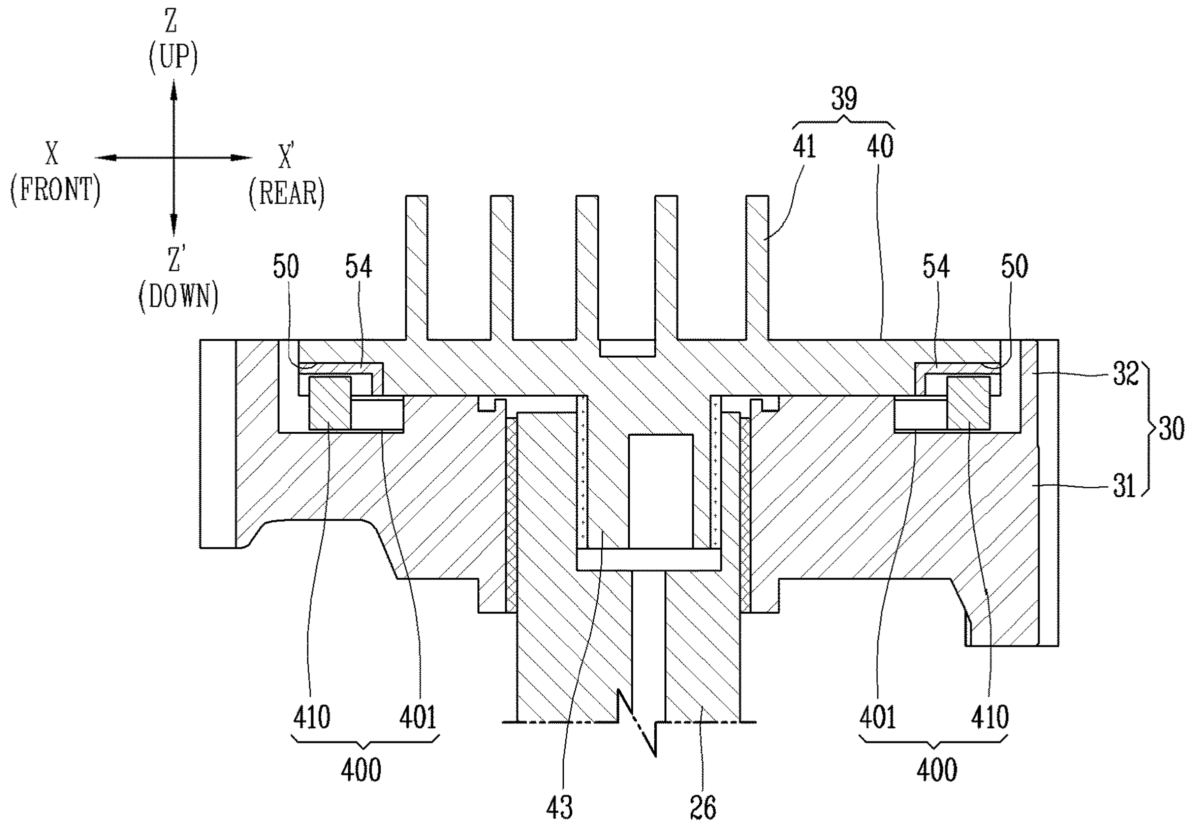
FIG. 12 is a cross-sectional view illustrating a state in which a first key groove forming part for preventing wear is applied between the Oldham ring and the orbiting scroll according to the present disclosure.

FIG. 12 is a cross-sectional view illustrating a state in which a first key groove 55 for preventing wear is applied between an Oldham ring 400 and the orbiting scroll 39.

Figure 13:
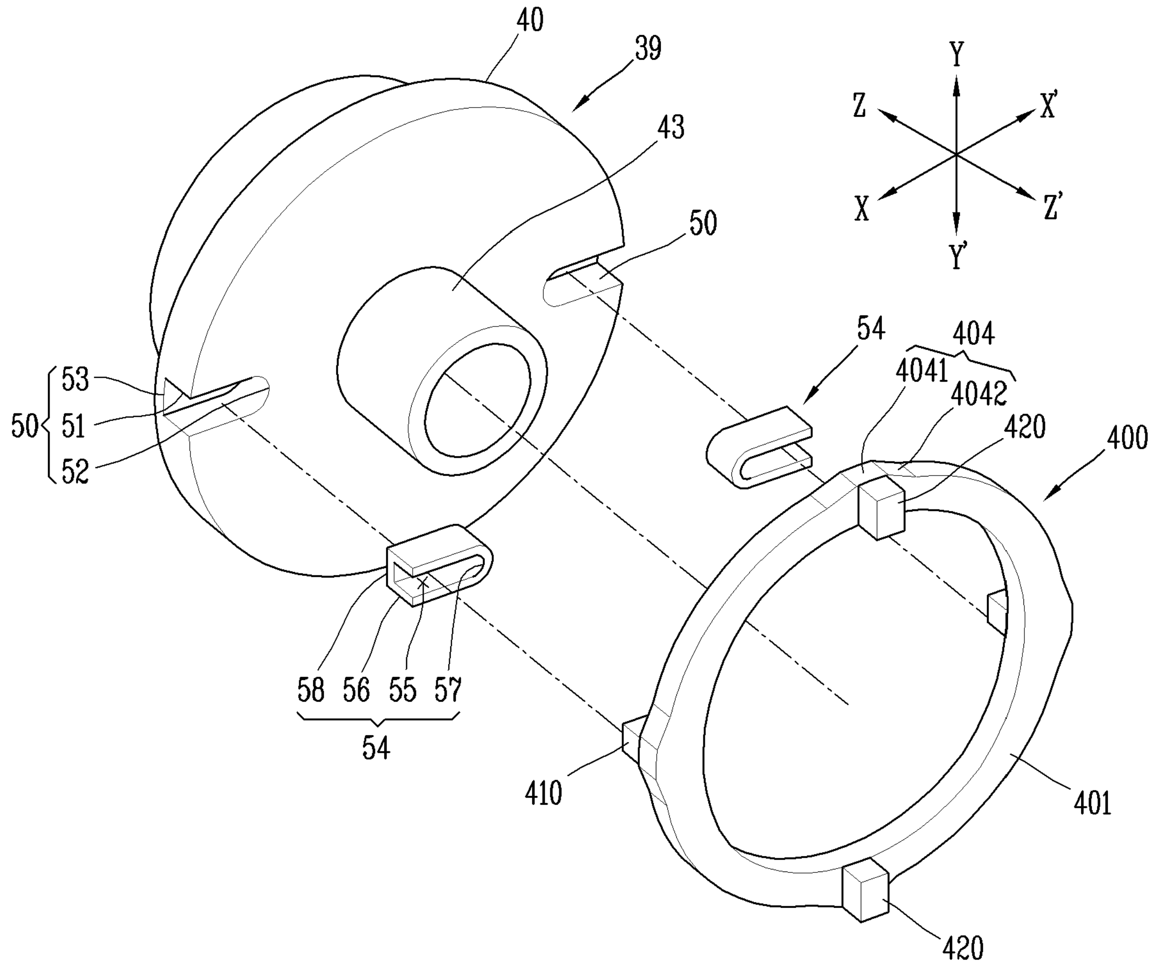
FIG. 13 is a perspective view illustrating a state in which the orbiting scroll, the first key groove forming part for preventing wear, and the Oldham ring are disassembled, in FIG. 12.

FIG. 13 is a perspective view illustrating a state in which the orbiting scroll 39, the first key groove 55 for preventing wear, and the Oldham ring 400 are disassembled, in FIG. 12.

A plurality of first key groove mounting parts 50 are disposed in the scroll thrust surface, which is the bottom surface of the second scroll 39.

The plurality of first key groove mounting parts 50 may be disposed to be spaced apart from each other at an interval of 180 degrees in the circumferential direction of the second end plate 40.

The first key groove mounting part 50 is recessed into the bottom surface of the second end plate 40 of the second scroll 39 in the thickness direction. The first key groove mounting part 50 may extend long in the radial direction of the second end plate 40. A radial length of the first key groove mounting part 50 is longer than its width.

An outer end portion of the first key groove mounting part 50 may be open radially outward. An inner end portion of the first key groove mounting part 50 is disposed to be spaced apart from the boss portion 43 in the radial direction. The inner end portion of the first key groove mounting part 50 has a structure closed with respect to the boss portion 43.

The inner end portion of the first key groove mounting part 50 may be formed in a circular curved shape.

A depth of the first key groove mounting part 50 is smaller than the thickness of the second end plate 40.

The first key groove mounting part 50 may include a plurality of side walls 51, an inner curved surface portion 52, and a horizontal surface portion 53.

The plurality of side walls 51 face each other with a spacing therebetween in a direction perpendicular to the radial direction. Each of the plurality of side walls 51 extends in the radial direction of the second end plate 40.

The inner curved surface portion 52 is formed in a semicircular curved shape. One end of the inner curved surface portion 52 is connected to one end of one of the plurality of side walls 51, and another end of the inner curved surface portion 52 is connected to one end of the other of the plurality of side walls 51, so that the plurality of side walls 51 can be connected to each other.

The horizontal surface portion 53 extends horizontally in a planar shape from upper ends of the plurality of side walls 51 and the inner curved surface portion 52.

The first key groove forming part 54 is received in the first key groove mounting part 50. The first key groove forming part 54 is mounted on the first key groove mounting part 50. An outer surface of the first key groove forming part 54 may be formed to correspond to a shape of the first key groove mounting part 50 along the side walls 51 and the inner curved surface portion 52 of the first key groove mounting part 50. The first key groove forming part 54 may be press-fitted to the first key groove mounting part 50 or may be adhered by an adhesive element such as an adhesive.

A first key groove 55 is formed inside the first key groove forming part 54. The first key groove forming part 54 may be formed of a material different from a material of the orbiting scroll 39. For example, the first key groove forming part 54 may be made of an iron-based material.

The first key groove forming part 54 includes a plurality of side wall plates 56, an inner plate 57, and a horizontal plate 58.

The plurality of side wall plates 56 face each other with a spacing therebetween in a direction perpendicular to the radial direction. Each of the plurality of side wall plates 56 extends in the radial direction of the second end plate 40.

Each of the plurality of side wall plates 56 extends to have the same length as the side wall 51 of the first key groove mounting part 50 and has a preset thickness. The first key groove 55 is formed between the plurality of side wall plates 56.

Thickness and length of each side wall plate 56 and a spacing between the plurality of side wall plates 56 facing each other may define length and width of the first key groove 55. A height of the side wall plate 56 may define a depth of the first key groove 55.

The inner plate 57 is formed in a semicircular curved shape. One end of the inner plate 57 is connected to one end of one of the plurality of side wall plates 56, and another end of the inner plate 57 is connected to one end of the other of the plurality of side wall plates 56, so that the plurality of side wall plates 56 can be connected to each other.

The horizontal plate 58 extends horizontally in a planar shape from upper ends of the plurality of side wall plates 56 and the inner plate 57. A thickness of the horizontal plate 58 may define the depth of the first key groove 55 as well as the height of the side wall plate 56.

The horizontal plate 58 can connect the upper ends of the plurality of side wall plates 56, respectively, thereby increasing rigidity of the first key groove forming part 54.

In addition, the horizontal plate 58 may connect open-side end portions of the plurality of side wall plates 56, such that the plurality of side wall plates 56 can maintain a constant distance therebetween and deformation of the side wall plates 56 can be minimized.

In addition, the horizontal plate 58 may have a structure in which one side of the first key groove forming part 54 in the axial direction is blocked.

The thickness of each of the side wall plate 56, the inner plate 57, and the horizontal plate 58 should be able to sufficiently secure rigidity to withstand external shocks well and to minimize the occurrence of deformation.

The thicknesses of the plurality of side wall plates 56 and the inner plate 57 are the same or similar.

The thicknesses of the side wall plate 56 and the horizontal plate 58 may be different from each other.

For example, the horizontal plate 58 may be formed to be thinner than the side wall plate 56.

The first key groove forming part 54 may be press-fitted to the first key groove mounting part 50.

According to the embodiment of FIGS. 1 to 5, an inner or outer diameter of the Oldham ring may increase more than that of the related art Oldham ring, and a difficulty in securing a sufficient wall thickness around the slot 102 of the Oldham ring 100 may occur.

However, according to this embodiment, the related art (existing) Oldham ring 400 can be used as it is and also the aforementioned problems can be improved.

The Oldham ring 400 may include a ring body 401, a first key 410, and a second key 420.

The ring body 401 may be formed in a circular ring shape. The ring body 401 includes an outer circumferential surface, an inner circumferential surface, one axial side surface (Z-axis direction, upper surface), and another axial side surface (Z-axis direction, lower surface).

The outer circumferential surface of the ring body 401 is formed in a curved shape having a predetermined curvature in the circumferential direction along an outermost circumference of the ring body 401. The inner circumferential surface of the ring body 401 is formed in a curved shape having a predetermined curvature in the circumferential direction along an innermost circumference of the ring body 401.

The outer and inner circumferential surfaces of the ring body 401 are closed curved surfaces.

The one axial side surface of the ring body 401 faces the second end plate 40 of the second scroll 39 and is formed as a horizontal plane.

The another axial side surface of the ring body 401 faces an opposite side of the second end plate 40, i.e., the back pressure space of the frame 30, and is formed as a horizontal plane.

A plurality of protrusions 404 may be provided on the outer circumferential surface of the ring body 401. The plurality of protrusions 404 protrude radially outward from the outer circumferential surface. Each of the plurality of protrusions 404 may include a planar portion 4041 and a plurality of inclined portions 4042.

The planar portion 4041 is formed to be planar in a tangential direction with respect to the outer circumferential surface of the ring body 401.

The plurality of inclined portions 4042 are disposed on both sides of the planar portion 4041 with the planar portion 4041 interposed therebetween. One end of each inclined portion 4042 is connected to the planar portion 4041, and another end of the inclined portion 4042 is connected to the outer circumferential surface of the ring body 401. The inclined portion 4042 is inclined radially outward from the outer circumferential surface toward the planar portion 4041.

The plurality of protrusions 404 are spaced apart from each other at an equal interval in the circumferential direction along the outer circumferential surface of the ring body 401. The plurality of protrusions 404 may be four that are disposed to be spaced apart from one another at intervals of 90 degrees.

The plurality of first keys 410 protrude from the one axial side surface (upper surface in Z-axis direction) of the ring body 401 to be received in the plurality of first key grooves 55. The plurality of first keys 410 are spaced apart from each other on the one axial side surface of the ring body 401 at an interval of 180 degrees in the circumferential direction.

The first key 410 is disposed to be slidable along an inner surface of the first key groove 55.

In a rectangular cross-section of the first key 410, a transverse or longitudinal length of the first key 410 is formed to be the same as or almost similar to the width of the first key groove 55. A transverse side surface or longitudinal side surface of the first key 410 is made to be in surface contact with a radial side surface of the first key groove 55, i.e., an inner surface of the side wall plate 65.

The plurality of first keys 410 may slide in the radial direction of the ring body 401 along the first key grooves 55. According to this configuration, the orbiting scroll 39 can perform a relative motion (sliding motion) with respect to the Oldham ring 400.

The plurality of second keys 420 protrude toward the frame end plate 31 from the another axial side surface of the ring body 401 that faces the opposite side to the orbiting scroll 39.

The plurality of second keys 420 are spaced apart from each other on the another axial side surface of the ring body 401 at an interval of 180 degrees in the circumferential direction.

The second key 420 may be formed in a rectangular shape. A longitudinal length of the second key 420 in the radial direction may be longer than its transverse length in the widthwise direction.

The first key 410 and the second key 420 may be disposed between the protrusion 404 and the inner circumferential surface of the ring body 401.

The plurality of second keys 420 may be disposed to be spaced apart from the plurality of first keys 410 at intervals of 90 degrees in the circumferential direction.

A plurality of second key grooves may be recessed in the frame end plate 31 in the thickness direction or the axial direction, or a plurality of second key groove mounting parts and a plurality of second key groove forming parts may be press-fitted to the plurality of second key grooves. In the latter case, second key grooves may be formed inside the second key groove forming parts.

This embodiment illustrates a state in which the plurality of second key grooves are recessed in the thickness direction.

The frame 30 may be formed of an iron-based material.

The plurality of key grooves 33 may extend long in the radial direction of the frame end plate 31.

The second key 420 may be received in the key groove of the frame 30. The second key 420 may be disposed to be radially slidable along the key groove.

The first key groove 55 and the second key groove may be alternately disposed to be spaced apart from each other at an interval of 90 degrees in the circumferential direction of the ring body 401 when projected in the axial direction. The first key groove 55 and the second key groove may be perpendicularly disposed.

As the second key 420 slides along the second key groove of the frame 30, the Oldham ring 400 may perform a relative motion (sliding motion in the radial direction) relative to the frame 30.

Sliding directions of the first key 410 and the second key 420 may be made perpendicular to each other.

The first key 410 may slide along the first key groove 55 of the second scroll 39 in the first radial direction, and the second key 420 may slide along the second key groove of the frame 30 in the second radial direction perpendicular to the first radial direction.

The second scroll 39 may slide relative to the Oldham ring 400 in the first radial direction, and the Oldham ring 400 may slide relative to the frame 30 in the second radial direction.

According to this, the Oldham ring 400 can prevent the second scroll 39 from rotating, so that the second scroll 39 can perform an orbiting motion relative to the first scroll 34 with being engaged with the first scroll 34 without rotating centering on the first scroll 34.

Therefore, according to the present disclosure, the first key groove forming part 54 provided in the orbiting scroll 39 defines the first key groove 55 for receiving the first key 410 of the Oldham ring 400, and the first key groove forming part 54 is formed of a different material such as an iron-based material, which has excellent wear resistance, from the aluminum material of the orbiting scroll 39 and the Oldham ring 400, thereby improving friction characteristics.

In addition, the first key groove forming part 54 defining the first key groove 55 can have increased rigidity by virtue of its thick thickness, and an occurrence of deformation of the first key groove forming part 54 can be minimized when press-fitting the first key groove forming part 54 of the orbiting scroll 39.

The first key groove forming part 54 has the structure with one axial side closed. Therefore, the horizontal plate 58 that defines a closed portion of the first key groove forming part 54 horizontally extends to shield the upper ends of the plurality of side wall plates 56 and the inner plate 57 defining the inner surfaces of the first key groove forming part 54, thereby structurally increasing the rigidity of the first key groove forming part 54.

In addition, each of the plurality of side wall plates 56, the inner plate 57, and the horizontal plate 58 that define the first key groove forming part 54 is made of the iron-based material having a thickness to ensure rigidity and excellent wear resistance, such that surface polishing can be allowed. This can improve surface roughness and assembly property. In addition, since the surface of the first key groove 55 is evenly polished, the first key 410 can smoothly slide without being stuck.

On the other hand, when the frame 30 is formed of aluminum in order to reduce the weight of the compressor, the second key groove forming part is formed of the different material such as the iron-based material having the excellent wear resistance, and is also applied to the frame end plate 31, thereby improving the friction/wear characteristics between the second key 420 and the second key groove forming part.

Since the second key groove forming part is the same as or similar to the first key groove forming part 54 except for the position where it is located, a redundant description of the second key groove forming part will be omitted.

Since other components are the same as or similar to those in the embodiment of FIGS. 1 to 5, duplicated descriptions will be omitted.

(9) Another Embodiment of First Key Groove Forming Part 64 that is Made of Different Material and Applied to Orbiting Scroll 39

Figure 14:
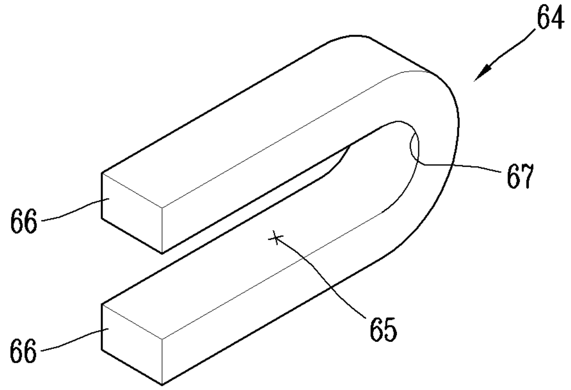
FIG. 14 is a conceptual view illustrating another embodiment of a first key groove forming part made of a different material according to the present disclosure.

FIG. 14 is a conceptual view illustrating another embodiment of a first key groove forming part 64 made of a different material according to the present disclosure.

This embodiment is different from the embodiment of FIGS. 12 and 13 in that a first key groove forming part 64 penetrates in the axial direction.

The first key groove forming part 64 according to this embodiment is similar to that of the embodiment of FIGS. 12 and 13 in that it has a plurality of side wall plates 66 and an inner plate 67, but different from the embodiment of FIGS. 12 and 13 in that the horizontal plate 58 is excluded.

Since other components are the same as or similar to those in the embodiment of FIGS. 12 to 13, duplicated descriptions will be omitted.

(10) Various Embodiments Regarding Radial and Axial Separation Prevention Structure of First Key Groove Forming Part 54, 64 that is Made of Different Material and Applied to Orbiting Scroll 39

The present disclosure provides a radial and axial separation prevention structure for preventing the first key groove forming part 54, 64 mounted on the first key groove mounting part 50 of the orbiting scroll 39 from being separated axially and radially from the first key groove mounting part 50 of the orbiting scroll 39.

When a second key groove forming part is formed in the frame 30, the second key groove forming part can be configured to have the same fastening structure as the first key groove forming part 54, 64. Accordingly, a description of the fastening structure of the second key groove forming part will be replaced with the radial and axial separation prevention structure of the first key groove forming part 54, 64.

Since other components are the same as or similar to those in the embodiment of FIGS. 12 to 13, duplicated descriptions will be omitted. Other components of various embodiments for the radial and axial separation prevention structure of the first key groove forming part 54, 64 described below may be applied similarly.

① One Embodiment of Radial and Axial Separation Prevention Structure of First Key Groove Forming Part 54

Figure 15:
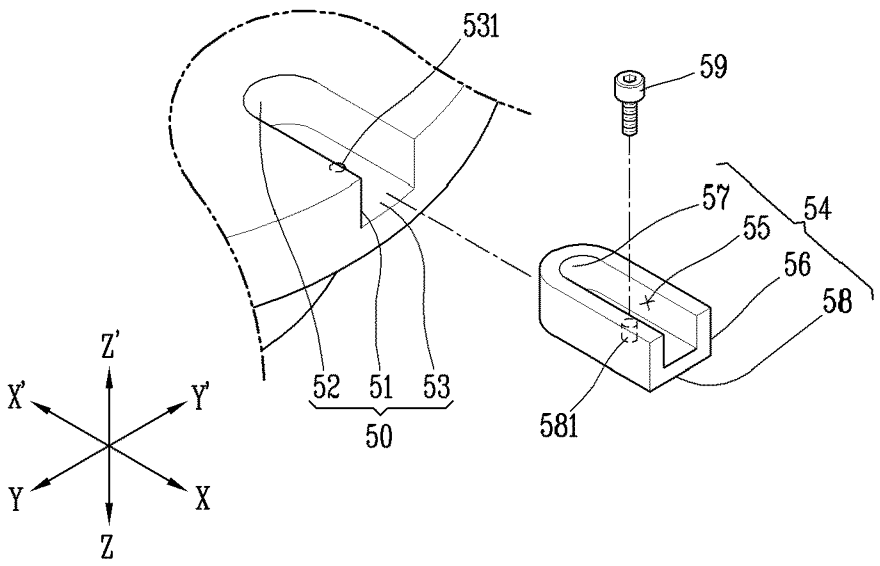
FIG. 15 is a conceptual view illustrating a structure, to which an anti-separation member of a first key groove forming part 54 according to one embodiment of the present disclosure is applied.

FIG. 15 is a conceptual view illustrating a structure, to which an anti-separation member of the first key groove forming part 54 according to one embodiment of the present disclosure is applied.

In this embodiment, a separation prevention member may be implemented as a fastening member 59 such as a screw.

A fastening hole 581 may be formed in the horizontal plate 58 of the first key groove forming part 54. The fastening hole 581 may be formed in a circular shape through the horizontal plate 58 in a thickness direction or axial direction to surround an outer circumferential surface of the fastening member 59. A diameter of the fastening hole 581 may correspond to a diameter of a screw portion of the fastening member 59.

A fastening groove 531 may be formed in the horizontal surface portion 53 of the first key groove forming part 54. The fastening groove 531 may have the same diameter as the fastening hole 581 of the first key groove forming part 54. The fastening groove 531 may overlap the fastening hole 581 of the first key groove forming part 54 in the axial direction.

With to this configuration, the fastening member 59 such as a screw is fastened to the fastening groove 531 of the first key groove mounting part 50 through the fastening hole 581 of the first key groove forming part 54, thereby preventing the first key groove forming part 54 from being separated from the first key groove mounting part 50 in the radial and axial directions.

② Another Embodiment of Radial and Axial Separation Prevention Structure of First Key Groove Forming Part 54

Figure 16:
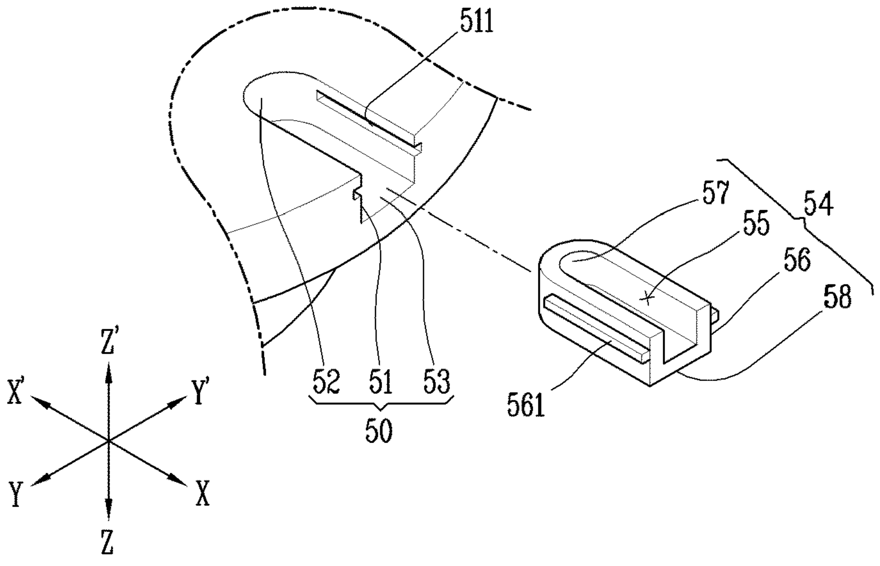
FIG. 16 is a conceptual view illustrating a structure, to which an anti-separation member of a first key groove forming part 54 according to another embodiment of the present disclosure is applied.

FIG. 16 is a conceptual view illustrating a structure, to which an anti-separation member of the first key groove forming part 54 according to another embodiment of the present disclosure is applied.

In this embodiment, protrusions 561 are disposed on the side wall plates 56 of the first key groove forming part 54 as a separation prevention unit of the first key groove forming part 54. The protrusions 561 may protrude from the side wall plates 56 of the first key groove forming part 54 toward the side walls 51 of the first key groove mounting part 50, respectively.

The protrusions 561 may be formed in a shape of a circle, rectangle, etc., having a polygonal cross-section. This embodiment illustrates a case where the protrusion 561 is formed in a rectangular shape.

The plurality of protrusions 561 may protrude from the both side wall plates 56 of the first key forming part 54, respectively.

The protrusions 561 may extend along a longitudinal direction of the side wall plates 56 of the first key groove forming part 54.

Protrusion receiving grooves 511 are formed respectively in the side walls 51 of the first key groove mounting part 50 so that the protrusions 561 are inserted.

The protrusion receiving grooves 511 may be recessed into the side walls 51 of the first key groove mounting part 50 in a direction that the protrusions 561 protrude. Each of the protrusion receiving grooves 511 may have a size corresponding to the protrusion 561 and may face the protrusion 561 to be engaged with the same.

With this configuration, when assembling the first key groove forming part 54, the plurality of protrusions 561 may be coupled into the protrusion receiving grooves 511 by sliding in the radial direction of the orbiting scroll.

The protrusions may be press-fitted to the protrusion receiving grooves 511.

Accordingly, the protrusions 561 can prevent the first key groove forming part 54 from being separated from the first key groove mounting part 50 in the axial and radial directions.

③ Still Another Embodiment of Radial and Axial Separation Prevention Structure of First Key Groove Forming Part 54

Figure 17:
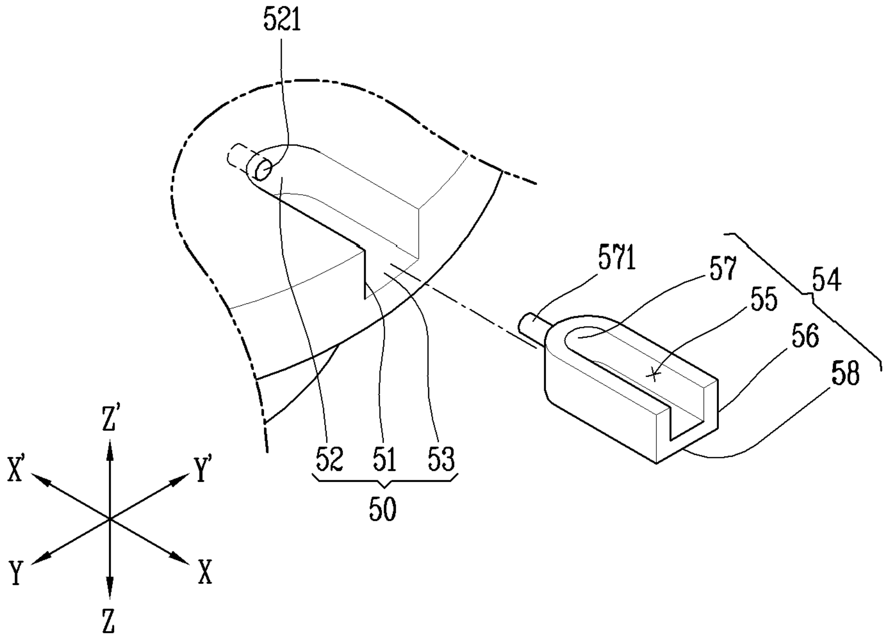
FIG. 17 is a conceptual view illustrating a structure, to which an anti-separation member of a first key groove forming part 54 according to still another embodiment of the present disclosure is applied.

FIG. 17 is a conceptual view illustrating a structure, to which an anti-separation member of the first key groove forming part 54 according to still another embodiment of the present disclosure is applied.

In this embodiment, a fixing protrusion 571 is disposed on the inner plate 57 of the first key groove forming part 54 as a separation prevention unit of the first key groove forming part 54. The fixing protrusion 571 may protrude from an outer circumferential surface of the inner plate 57 of the first key groove forming part 54 toward the inner curved surface portion of the first key groove mounting part 50.

The fixing protrusion 571 may be formed in a shape of a circle, rectangle, etc., having a polygonal cross-section. This embodiment illustrates a case where the fixing protrusion 571 is formed in a circular shape.

The fixing protrusion 571 may extend to protrude from the inner plate 57 56 of the first key groove forming part 54 in the radial direction. The fixing protrusion 571 may protrude from the inner plate 57 to the inside of the orbiting scroll in the radial direction.

A protrusion fixing groove 521 is disposed in the inner curved surface portion of the first key groove mounting part 50 so that the fixing protrusion 571 is inserted.

The protrusion fixing groove 521 may be recessed into the inner curved surface portion of the first key groove mounting part 50 in a direction that the fixing protrusion 571 protrudes. The protrusion fixing groove 521 may have a size corresponding to the fixing protrusion 571 and may face the fixing protrusion 571 to be engaged with the same.

With this configuration, when assembling the first key groove forming part 54, the fixing protrusion 571 may be coupled into the protrusion fixing groove 521 by sliding in the radial direction of the orbiting scroll.

The fixing protrusion 571 may be press-fitted to the protrusion fixing groove 521.

Accordingly, the protrusion 571 can prevent the first key groove forming part 54 from being separated from the first key groove mounting part 50 in the axial and radial directions.

The separation prevention units according to the embodiments of FIGS. 15 to 17 may be applied separately or may be applied in combination. The separation prevention units according to the embodiments of FIGS. 15 to 17 show examples applied to the first key groove forming part 54 that includes the plurality of side wall plates 56, the inner plate 57, and the horizontal plate 58, but may be equally applied to the first key groove forming part 54 that merely includes the plurality of side wall plates 56 and the inner plate 57.

The invention claimed is:

1. A scroll compressor comprising:
- a fixed scroll;
- an orbiting scroll configured to engage the fixed scroll;
- a rotating shaft eccentrically coupled to the orbiting scroll and configured to operate the orbiting scroll;
- an Oldham ring having a ring body that defines a plurality of slots;
- a plurality of first keys coupled to the orbiting scroll and inserted to the plurality of slots, respectively, the plurality of first keys being configured to slide at the plurality of slots in a radial direction, and the plurality of first keys including a material different from a material of the Oldham ring; and
- a plurality of press-fit pins extending radially inward from an outer peripheral surface of the orbiting scroll and coupled to the plurality of first keys.

2. The scroll compressor of claim 1, wherein the plurality of first keys protrude from an axial side surface of the orbiting scroll toward the plurality of slots, and
- wherein the plurality of slots extend from the ring body in the radial direction and are defined through the ring body in an axial direction.

3. The scroll compressor of claim 1, wherein the orbiting scroll and the Oldham ring include a same material.

4. The scroll compressor of claim 1, wherein the orbiting scroll and the Oldham ring include an aluminum material, and
- wherein the plurality of first keys include an iron-based material.

5. The scroll compressor of claim 1, wherein the plurality of first keys include a porous material.

6. The scroll compressor of claim 1, wherein the plurality of first keys protrudes from an axial side surface of the orbiting scroll toward the plurality of slots, and
- wherein each of the plurality of slots has a side being open toward a corresponding one of the plurality of first keys and an opposite side being shielded by a shielding portion.

7. The scroll compressor of claim 1, wherein the plurality of first keys have a rectangular cross-sectional shape,
- wherein a radial length of each of the plurality of slots is longer than a radial length of a corresponding one of the plurality of first keys, and
- wherein a side surface of each of the plurality of slots slidably contacts a side surface of a corresponding one of the plurality of first keys.

8. The scroll compressor of claim 1, wherein the orbiting scroll further comprises:
- an orbiting scroll end plate supporting an orbiting wrap that is configured to engage the fixed scroll;
- a plurality of fixing grooves defined at a first axial side surface of the orbiting scroll end plate facing an opposite side to the fixed scroll;
- a plurality of fastening grooves defined at a radial outer surface of the orbiting scroll end plate in a direction crossing the plurality of fixing grooves; and
- the plurality of press-fit pins extending through the plurality of first keys via the plurality of fastening grooves to enable the plurality of first keys coupled to the plurality of fixing grooves to be fastened to the orbiting scroll,
- wherein the plurality of first keys include a plurality of second fastening holes radially overlapping the plurality of fastening grooves.

9. The scroll compressor of claim 1, wherein the Oldham ring includes protrusions protruding radially from at least one of an outer circumferential surface of the ring body or an inner circumferential surface of the ring body.

10. The scroll compressor of claim 1, further comprising:
- a casing; and
- a frame fixed to an inside of the casing together with the fixed scroll, the frame supporting the rotating shaft and allowing the rotating shaft to rotate,
- wherein the Oldham ring is disposed between the orbiting scroll and the frame, and
- wherein the Oldham ring includes a plurality of second keys protruding from an axial side surface of the ring body toward the frame and received at a plurality of key grooves defined at the frame, the plurality of second keys being configured to slide with respect to the plurality of key grooves.

11. The scroll compressor of claim 1, further comprising:
- a casing; and
- a frame fixed to an inside of the casing together with the fixed scroll, the frame supporting the rotating shaft and allowing the rotating shaft to rotate,
- wherein the Oldham ring is disposed between the orbiting scroll and the frame,
- wherein the orbiting scroll, the frame, and the Oldham ring include an aluminum material,
- wherein the plurality of first keys are disposed between the orbiting scroll and the Oldham ring and contact the plurality of first slots,
- wherein the Oldham ring includes a plurality of second keys protruding from an axial side surface of the ring body toward the frame and received at a plurality of key grooves defined at the frame, the plurality of second keys being configured to slide with respect to the plurality of key grooves, wherein the plurality of second keys are disposed between the frame and the ring body of the Oldham ring and contact a plurality of second slots defined at the ring body, and wherein the plurality of first keys and the plurality of second keys include an iron-based material that is different from the material of the Oldham ring.

* * * * *